United States Patent
Horbal et al.

[19]

[11] Patent Number: 6,112,246
[45] Date of Patent: Aug. 29, 2000

[54] SYSTEM AND METHOD FOR ACCESSING INFORMATION FROM A REMOTE DEVICE AND PROVIDING THE INFORMATION TO A CLIENT WORKSTATION

[76] Inventors: Mark T. Horbal, 32802 Fowler Cir., Warrenville, Ill. 60555; Randal J. King, 3 S. 947 Thornapple Tree Rd., Sugar Grove, Ill. 60554

[21] Appl. No.: 09/176,993

[22] Filed: Oct. 22, 1998

[51] Int. Cl.[7] .................................................. G08C 15/06
[52] U.S. Cl. ............................................................. 709/230
[58] Field of Search .................................... 364/131, 138; 345/333–335; 709/203, 217, 219, 223, 224, 230

[56] References Cited

U.S. PATENT DOCUMENTS

| | | |
|---|---|---|
| 4,860,216 | 8/1989 | Linsenmayer . |
| 4,901,218 | 2/1990 | Cornwell . |
| 5,428,555 | 6/1995 | Starkey et al. . |
| 5,472,347 | 12/1995 | Nordenstrom et al. . |
| 5,512,890 | 4/1996 | Everson, Jr. et al. . |
| 5,528,219 | 6/1996 | Frohlich et al. . |
| 5,598,521 | 1/1997 | Kilgore et al. . |
| 5,664,101 | 9/1997 | Picache . |
| 5,794,032 | 8/1998 | Leyda ........................................... 713/2 |
| 5,805,442 | 9/1998 | Crater et al. ............................. 364/138 |

*Primary Examiner*—Zarni Maung
*Attorney, Agent, or Firm*—Banner & Witcoff, Ltd.

[57] ABSTRACT

A micro-server adapted to be embedded into a piece of industrial machinery, an automobile, a consumer product, and the like, for publishing information, possibly in the form of web pages, about the device into which the micro-server is embedded or with which it is associated and/or for controlling a micro-server equipped device from a possibly remote client. The information may be published such that it is accessible using a standard web-browser. Other suitable protocols could also be used. The micro-server is capable of interfacing with a device to access information from the device, such as control or maintenance information. The micro-server can then organize and format that information compatible with a communication protocol in preparation for publishing the information. The micro-server conveniently abstracts from the first device the details of the communication protocol used to publish the information.

35 Claims, 17 Drawing Sheets

FIG. 7

DAQ 37-Netscape

File Edit View Go Communication Help

Back Forward Reload Home Search Netscape Print Security Stop

Mfg. Name  V Technology Group Incorporated
Mfg. Desc.  LubeMonDAQ Node
Mfg. Model: DAQ2.1
User Desc:  Paint Shop Staging
User Id:    CONVEYOR P156
User Loc:   Bldg 6.A23

- Read
- Control
- Maint
- Admin
- Discover

Micro Server Release 1.42

Auto Refresh:  off

Now:  4.16.98 14:07:23
Upd:  4.16.98 14:07:01

Parameter Values

| Id | Parameters | Unit | Value | Alrm | Norm | Low | High |
|---|---|---|---|---|---|---|---|
| D0001 | Drive Current | A | 50.70 | | 100.00 | 60.00 | 120.00 |
| D0002 | Drive Voltage | V | 242.56 | | 240.00 | 230.00 | 250.00 |
| D0003 | Drive Power | HP | 12.12 | | 13.00 | 9.00 | 15.00 |
| D0004 | Take-up Pressure | PSI | 57.77 | ● | 70.00 | 60.00 | 90.00 |
| D0005 | Reducer Temperature | °F | 95.45 | | 90.00 | | 180.00 |
| D0006 | Chain Velocity | ft/min | 60.02 | | 50.00 | 45.00 | 80.00 |
| D0007 | Chain Growth | in | 101.93 | | 90.00 | 20.00 | 180.00 |
| D0008 | Chain Growth | % | 0.015 | | 90.00 | 20.00 | 180.00 |
| D0009 | Lubricant Level | % | 56.93 | | 50.00 | 10.00 | |

SYSTEM AND METHOD FOR ACCESSING INFORMATION FROM A REMOTE DEVICE AND PROVIDING THE INFORMATION TO A CLIENT WORKSTATION

BACKGROUND OF THE INVENTION

1. Field of the Invention

This invention relates to providing information from a first device to a second device. More particularly, this invention relates to a micro-server system comprising a micro-server capable of being embedded into and/or associated with industrial equipment and/or consumer devices/products and capable of publishing information about such equipment and/or devices/products to thin clients running standard web browser software.

2. Statement of Related Art

Industrial process information is typically collected and used primarily through the offerings of a handful of key industrial information collection companies, or through internal home-brew solutions. Both approaches are costly to implement because the collecting architecture is very specific to the individual devices and to the whole process. Almost all the transport protocols are proprietary, and much of the media used to interconnect these devices, like RS-485, DeviceNet, and the like, are either proprietary or are limited to connecting only these kinds of devices. For a very remotely located device, options for connection can be severely limited.

In addition, most prior art solutions are hard-wired to the process, and a central host collects and manages device data, as is shown in FIG. 1. A central host is not a natural place for this information. The data is more timely, accurate, and meaningful at the device to which the data pertains.

Should the process change, re-wiring or re-instrumenting of prior art systems is typically needed. Re-programming the host is an enormous task fraught with the potential for bringing the whole process to a halt. The proprietary software that communicates with the host is usually licensed for, and installed on, each client computer, representing a big investment even from the update management perspective alone.

A significant drawback of such prior art systems is that if the host fails or is unreachable for any reason, all tactical and strategic data becomes unavailable.

Therefore, it is an object of this invention to simultaneously remove the host computer, as shown in FIG. 2 in which micro-server is abbreviated μServer, remove the need for customer programming, unify the network fabric throughout factories and offices (Ethernet), provide secure access to any effector or device in the process from any workstation in the enterprise, and reduce the total cost of ownership.

It is an additional object of this invention to prevent information about a device from being maintained on a centralized host computer and to allow such information to reside in the actual device itself. With the information residing in the device itself, if the device is moved, its data moves with it. If the device is replaced, the new device can automatically publish its new data according to the principles of this invention.

It is a further object of this invention to enable devices to come on line and be browsable by a browser when the devices are shipped from the OEM. According to the principles of this invention, such devices could be capable of providing operational data, limits, suggested maintenance cycles, specifications, links to the manufacturer's web site for detailed drawings, and literally whatever other information that the OEM desires.

Typically, original equipment manufacturer ("OEM") software professionals do not program with the Windows Application Programming Interface ("API"), and therefore almost never write code for a network. Typically, however, they are very familiar with the embedded software necessary to monitor and control industrial devices.

It is therefore a further object of this invention to abstract and encapsulate the highly complex TCP/IP network layer and Internet Web services to provide a simple, yet comprehensive, API in the "embedded" problem space, with which most OEM software professionals are familiar. It is a further object of this invention to publish information about the industrial equipment, also referred to as the device data, to an enterprise or the world as a web page on the corporate Intranet or the larger Internet.

SUMMARY OF THE INVENTION

A system for providing information about a first device to a second device. A micro-server interfaces with the first device to access the information from the first device. The information is then organized and formatted compatible with a communication protocol in preparation for making the information available to said second device. The information is made available to the second device while abstracting the communication protocol from the first device.

The system could include: an OEM application programming interface ("API") for interfacing between the first device's software layer and the micro-server; a TCP/IP stack for interfacing with a hardware interface; a TCP/IP API for providing access to the TCP/IP protocol stack; a hardware Ethernet interface; a system services API for providing the micro-server access to system services from the first device; an HTTP protocol server for satisfying interactive HTTP requests; a browser for interacting with the first device; a TCP/IP-based server for satisfying TCP/IP-based requests; a hyperlink to a website associated with the first device; a web-site associated with the first device; a default applet server for providing default applets to the second device to interface with the first device; a time server for providing current time information; an auto-discovery and view server for automatically detecting the first device being coupled to an interface; and a browser for interacting with the first device.

BRIEF DESCRIPTION OF THE DRAWINGS

FIG. 7 is a sample Read (Default) page.

FIG. 13 illustrates a three party model for online access to micro-server-enabled device documentation.

DETAILED DESCRIPTION

Figure 1:
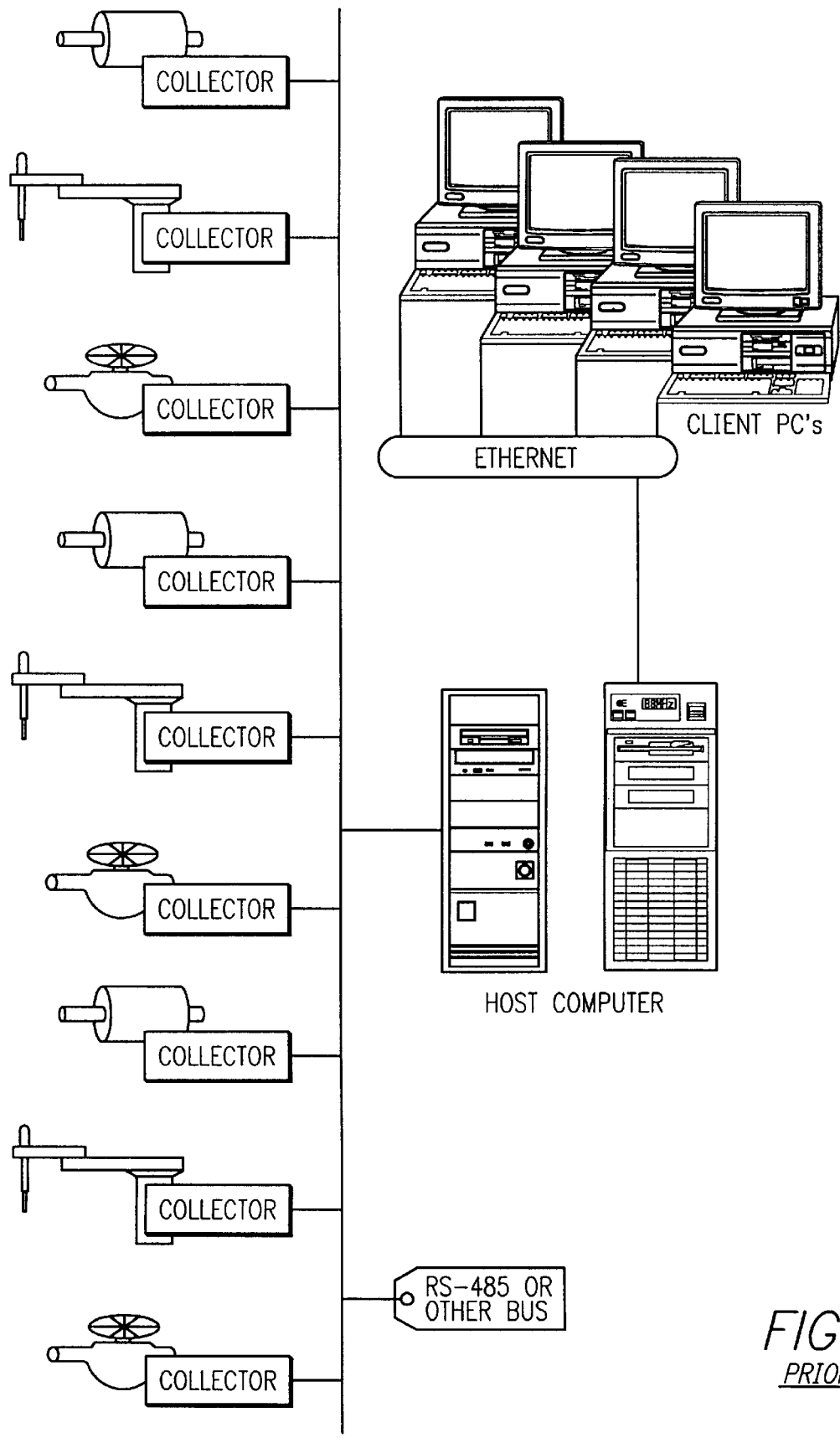
FIG. 1 illustrates a prior art architecture including a centralized host computer for collecting industrial process information.
Figure 2:
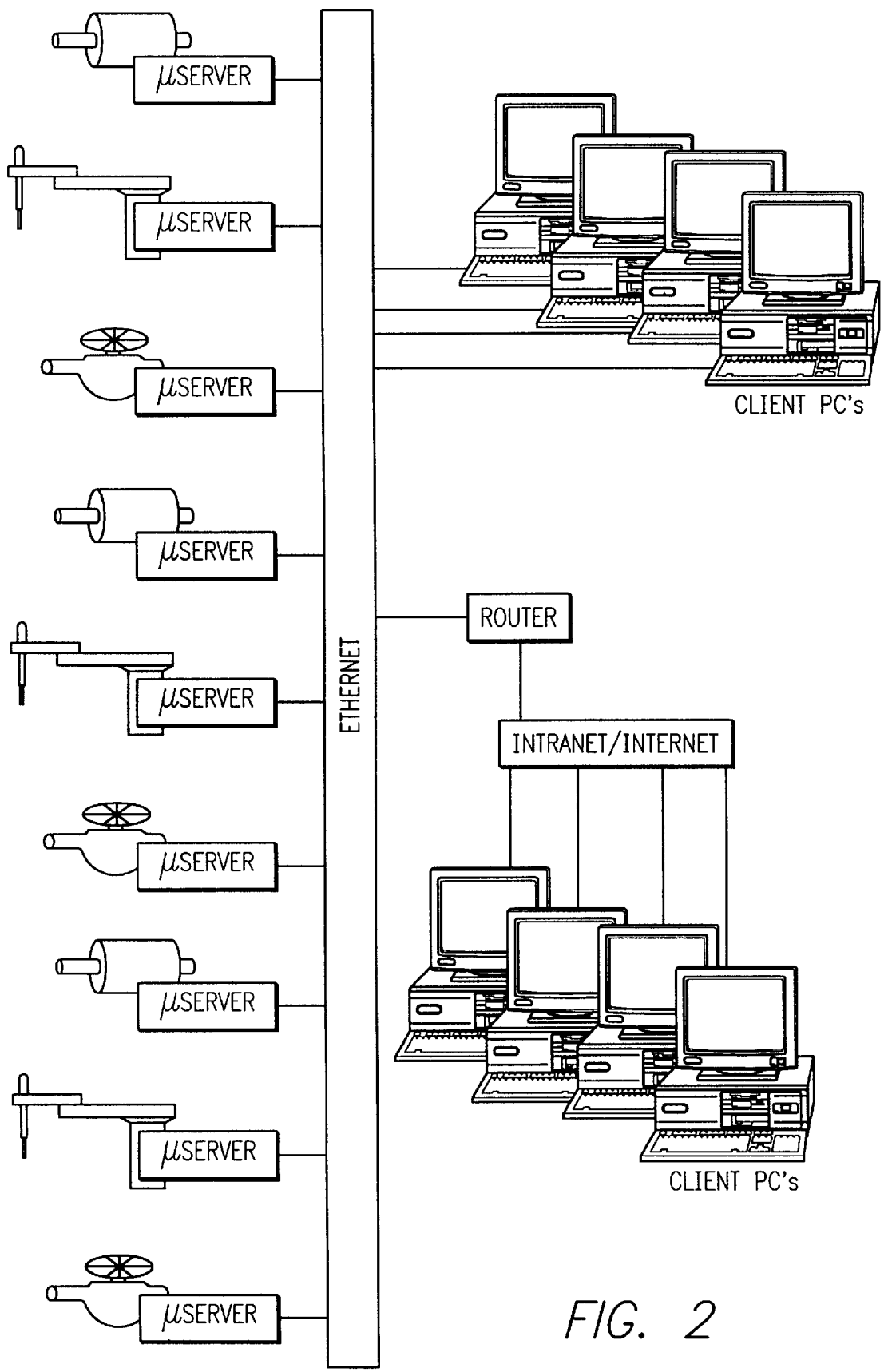
FIG. 2 illustrates a possible architecture, consistent with the principles of this invention, for publishing industrial process information.
Figure 3:
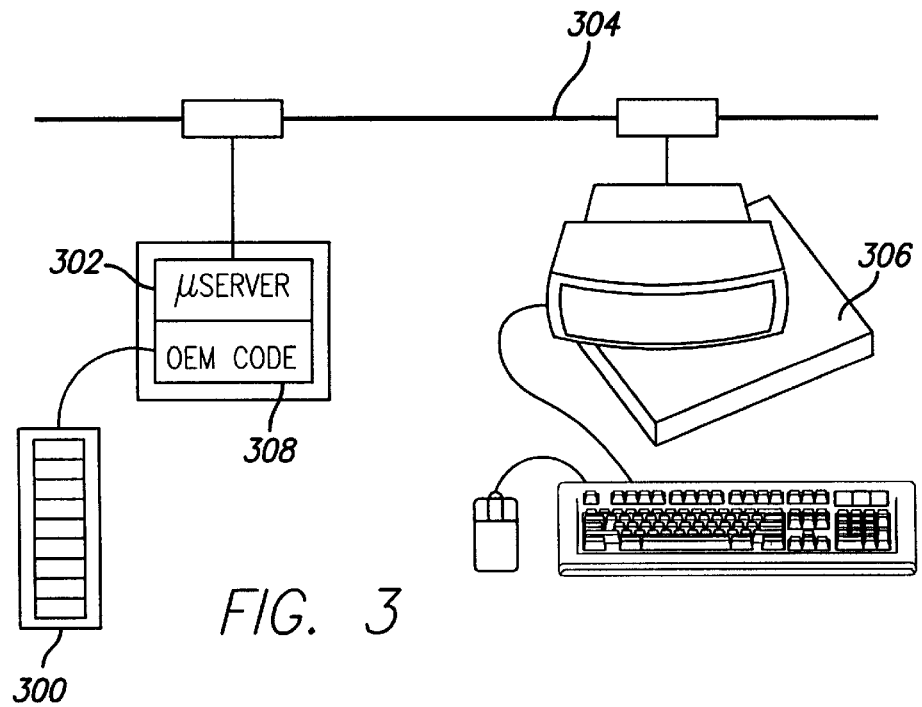
FIG. 3 illustrates a simplified example system in accordance with the principles of this invention.

The operation of the micro-server is similar to that of a general-purpose web server. For example, FIG. 3 shows a remote thermostat device 300, labeled Temp Sensor in FIG. 3, equipped with a micro-server 302, labeled μServer in FIG. 3, connected to the same Ethernet network 304 as a client workstation 306. The workstation could be used to monitor the remote temperature and/or to adjust the set point of the thermostat 300. The remote device contains two software components: (1) the OEM code 308 that performs the actual control functions and (2) the software of micro-server 302, which communicates with network clients. In this example, the workstation computer is considered a thin client, running no special software. All interactions with the remote micro-server-equipped thermostat device 300 is accomplished via a standard web browser program such as Netscape Communicator or Microsoft Internet Explorer. The micro-server-enabled thermostat device 300 could publish a standard web page containing the current temperature. Another page could be used to set the desired set point. Tremendous flexibility arises from the fact that multiple users, both local and far away, can access, view and change the information in the same manner without any special software, subject to configurable security measures.

Whenever a remote user accesses a micro-server-enabled device's web page, the micro-server software makes appropriate function calls to the OEM code to retrieve current information. Having done so, the micro-server incorporates the current information into the web page and sends the updated page to the requesting client machine. Similarly, whenever the user wishes to modify a control parameter, such as the set point of thermostat 300, a user could enter the desired temperature into a text box and submit the new information to micro-server 302. The micro-server 302 could then make appropriate function calls to the OEM code in order to change the setting.

In a first preferred embodiment of the invention, the micro-server is implemented in software. The micro-server could be provided to the OEM as a binary software library linked to the OEM application. Both the traditional static linking and the newer dynamic linking (DLL) methods are possible. In this embodiment, the OEM software could be linked with the micro-server libraries, which would then become an integral part of the micro-server-enabled device's embedded software. The micro-server software could then be placed in the non-volatile medium in the OEM's hardware, such as EPROM or EEPROM.

The arrangement of characteristics listed in Table 1, below, could be used. As will be apparent to those skilled in the art, other suitable arrangements could also be used without departing from the scope of this invention.

TABLE 1

Characteristics of the First Preferred Embodiment

| Characteristic | Description |
| --- | --- |
| OEM software contained in | OEM hardware |
| micro-server software contained in | OEM hardware |
| TCP/IP stack contained in | OEM hardware |
| Ethernet Interface in | OEM hardware |
| OEM side of OEM-micro-server API | OEM code |
| micro-server side of OEM-micro-server API | micro-server code |

In a second preferred embodiment, the micro-server could be an embedded-micro circuit board small enough to fit inside of the control box of a piece of industrial technology like a motor, a pump, a valve, or some other piece of process equipment. Of course, such an embedded-micro circuit board could also be placed into other types of devices and products, such as, consumer products. OEM software could be accommodated in the same board. In addition to the OEM and micro-server code, the software could include a TCP/IP protocol stack. As used in this specification and the appended claims, communication protocol dependent terms such as TCP/IP, HTTP, Ethernet, and the like, and means for supporting such protocols such as TCP/IP network protocol stack, and the like, are used for illustrative purposes only and should not be construed as limiting this invention to those particular protocols. As will be apparent to those skilled in the art, other appropriate communication protocols could also be used without departing from the scope of this invention. The hardware could include Ethernet support.

The characteristics of the second preferred embodiment of this invention could be arranged as in Table 2 below. As will be apparent to those skilled in the art, other suitable arrangements could also be used without departing from the scope of this invention.

TABLE 2

Characteristics of the Second Preferred Embodiment

| Characteristic | Description |
| --- | --- |
| OEM software contained in | hardware controller card |
| micro-server software contained in | hardware controller card |

TABLE 2-continued

Characteristics of the Second Preferred Embodiment

| Characteristic | Description |
| --- | --- |
| TCP/IP stack contained in | hardware controller card |
| Ethernet Interface in | hardware controller card |
| OEM side of OEM-micro-server API | OEM code |
| micro-server side of OEM-micro-server API | micro-server code |

In a third preferred embodiment, the micro-server could be a software component intended to run on a full WINDOWS platform (/95, /98, &/or /NT) or any other available operating system. This embodiment is useful in situations where the OEM's control platform is a computer capable of supporting a standard operating system environment. The operating system could provide TCP/IP support, and the computer's hardware could provide Ethernet connectivity. The characteristics of the third preferred embodiment of this invention could be arranged as in Table 3 below. As will be apparent to those skilled in the art, other suitable arrangements could also be used without departing from the scope of this invention.

TABLE 3

Characteristics of the Third Preferred Embodiment

| Characteristic | Description |
| --- | --- |
| OEM software contained in | OEM computer |
| Micro-server software contained in | OEM computer |
| TCP/IP stack contained in | OEM operating system or add-on |
| Ethernet Interface in | OEM computer |
| OEM side of OEM-micro-server API | OEM code |
| Micro-server side of OEM-micro-server API | micro-server code |

In a fourth preferred embodiment, the invention comprises hardware that does not contain the OEM code, the OEM code being embedded in its own hardware. The micro-server software is contained in its own micro-controller, with an Ethernet interface and an external hardware interface (e.g., serial, parallel, PC-104, etc.) to connect the micro-server's micro-controller to the OEM's micro-controller. In this embodiment, the OEM-to-micro-server API abstracts the hardware interface between the OEM hardware and the micro-server hardware. This embodiment is particularly useful for retrofitting existing devices for web operation.

The characteristics of the fourth preferred embodiment of this invention could be arranged as in Table 4 below. As will be apparent to those skilled in the art, other suitable arrangements could also be used without departing from the scope of this invention.

TABLE 4

Characteristics of the Fourth Preferred Embodiment

| Characteristic | Description |
| --- | --- |
| OEM software contained in | OEM hardware |
| Micro-server software contained in | hardware controller card |
| TCP/IP stack contained in | hardware controller card |
| Ethernet Interface in | hardware controller card |
| OEM side of OEM-micro-server API | OEM code on OEM hardware |
| Micro-server side of OEM-Micro-server API | micro-server code on hardware controller card |

A fifth preferred embodiment of this invention could use an embedded micro-controller built on a PC circuit board (ISA, PCI, etc.) that can be plugged into another computer. The micro-controller could contain the micro-server software and the TCP/IP network protocol stack. The OEM code could run on the computer that has the PC circuit board plugged into it.

TABLE 5

Characteristics of Fifth Embodiment

| Characteristic | Description |
| --- | --- |
| OEM software contained in | OEM computer |
| micro-server software contained in | plug-in hardware card |
| TCP/IP stack contained in | plug-in hardware card |
| Ethernet Interface in | plug-in hardware card |
| OEM side of OEM-micro-server API | OEM code on OEM hardware |
| Micro-server side of OEM-micro-server API | micro-server code on plug-in hardware card |

Each of the preferred embodiments comprises three Application Programming Interfaces ("APIs"): an OEM API, a TCP/IP stack API, and a System Services API. These APIs are suitable for use with current networking technology. It will be apparent to those skilled in the art that the concepts taught herein may be applied using API's other than those herein described and that the same or other API's may be used in connection with networking protocols developed in the future without departing from the scope of this invention.

The OEM API is used by the OEM software to configure the micro-server. The OEM API is also used to exchange data between the OEM software and micro-server software. The OEM API abstracts the micro-server to the OEM layer. The fundamental purpose of the OEM API is to provide a high level of abstraction for the micro-server from the OEM programmer's perspective. This allows the programmer to remain focused on the embedded application without having concern for the details of making the application web-enabled.

The OEM API is divided into five primary groups: (1) initialization group; (2) callback functions group; (3) system services group; (4) TCP/IP pass through group; and (5) scheduling group. An alphabetically organized listing of a micro-server OEM API functions including a synopsis of the call, the appropriate declaration, a narrative description of all arguments, the return value and associated usage notes are attached as Appendix A to this specification.

The OEM API Initialization group comprises a series of functions, which are called by the OEM software on power-up of the embedded device in order to inform the micro-server about variables which may be queried. For instance, a micro-server enabled servo-valve of the type typically used in chemical processing could be capable of providing data on its current setting (0–100%), fluid flow rate, and temperature. To make this data accessible to the outside world, the OEM program could advertise it to a co-embedded micro-server by executing a separate call to an appropriate API initialization function. Each such call could provide the name of the variable, e.g., Flow Rate, the units of measure, and a pointer to a callback function to be used by the micro-server to retrieve the value of that variable.

The OEM program could also execute similar API functions to inform the micro-server about its control points. The example servo-valve could have a single control point: the desired setting (0–100%). It could therefore make an appropriate call via the API to provide information about this control point and to provide a callback function that could be used to adjust this setting.

The OEM API callback functions advertised to the micro-server by the OEM software, could be used by the micro-server to retrieve the values of the OEM variables or to change device settings. The micro-server calling these callback functions will typically make up the bulk of interaction between the OEM software and the micro-server. Significantly, the OEM software is typically essentially unaware that the micro-server is making these calls. This is consistent with the desired abstraction of the micro-server from the embedded OEM software.

Preferably, the micro-server software is completely portable. Therefore, it typically does not make any assumptions regarding the presence or functionality of an underlying operating system. In order to provide the micro-server with very rudimentary system services, for example, access to non-volatile storage or timer services, the OEM software provides these to the micro-server, again, via callback functions. This occurs during initialization. As is similar to the data and control callback functions discussed above, the execution of these system callback functions is transparent to the OEM program.

In a standard micro-server-enabled device, the OEM software would not generally talk directly to TCP/IP clients. Such communications are typically handled by the micro-server and are invisible to the OEM software. The OEM API does, however, provide the ability for the OEM software to open a TCP server port and service special requests directly. When such requests arrive on the specified port, the micro-server passes them through to the OEM software. This occurs via a callback mechanism similar to those discussed above. The responses from the OEM software to the originating client are passed through the microserver in the opposite direction.

The scheduling group of the OEM API is comprised primarily of a function that is used by the OEM software to run the microserver software after the microserver has been initialized. The OEM software or hardware typically would make arrangements to allow the micro-server to run periodically. Since most embedded applications generally do not have an underlying operating system, the execution of the micro-server is typically controlled by either calling it periodically via a function from the OEM API scheduling group. Such a function call could occur, for example, by explicit periodic calls from the OEM software or by attaching the function to a timer interrupt.

In addition to the OEM API, each preferred embodiment comprises a second API, the TCP/IP stack API, which is used by the micro-server to communicate with the underlying TCP/IP stack. The TCP/IP API could be standardized to conform to the Winsock 1.1 interface standard. As will be apparent to those skilled in the art, other suitable interface standards may also be used without departing from the scope of this invention. The TCP/IP API abstracts the TCP/IP protocol stack to the micro-server.

Each preferred embodiment also comprises a third API, the System Services API, which is used to provide the limited service required by the micro-server. Since the micro-server is preferably software platform independent, the System Services API may be defined by the OEM code via the OEM API. As a consequence, the System Services API typically will not be usable by the micro-server until the initialization is complete. The System Services API provides the system services to the micro-server, while abstracting from the micro-server the details of providing such services.

The system services used by the micro-server during operation may be provided either by an underlying operating system or by the OEM code itself. The entity providing the services is typically transparent to the micro-server.

Figure 4:
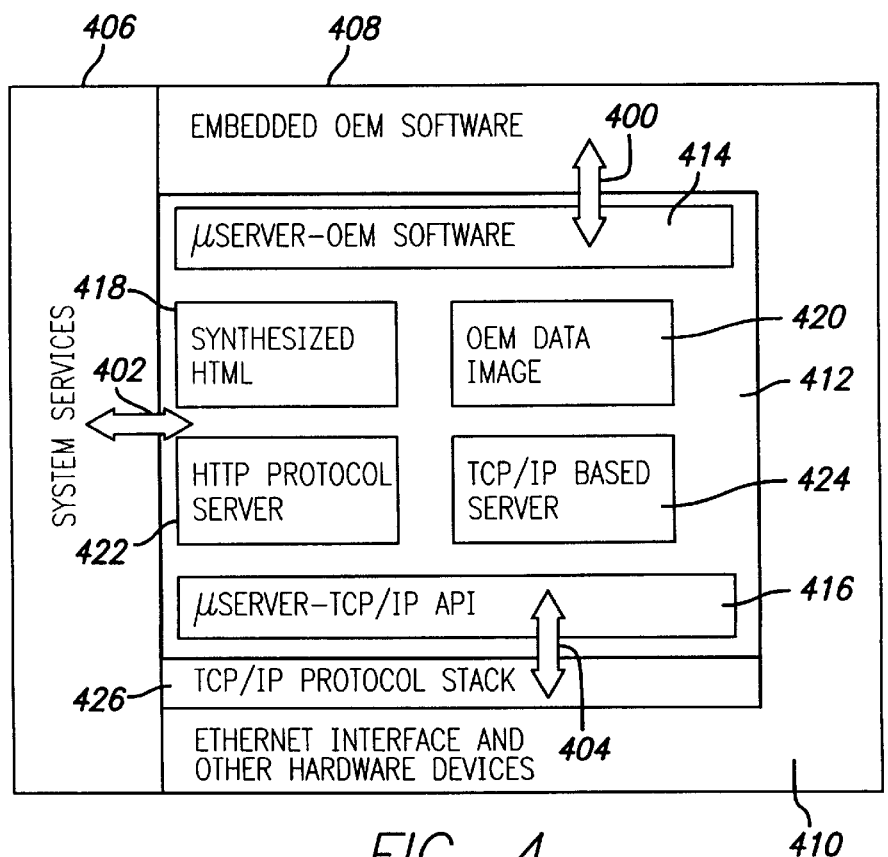
FIG. 4 is a simplified block diagram showing several subsystems of a micro-server according to this invention.

FIG. 4 is a simplified block diagram showing possible components of a micro-server. The OEM API is depicted by bold double-ended arrow 400. The System Services API is depicted by bold double-ended arrow 402. The TCP/IP API is depicted by bold double-ended arrow 404.

System services 406 provides the system services required by the micro-server. This software is abstracted from the micro-server's point of view and may be either a part of the native operating system or part of the OEM software layer. Embedded OEM Software layer 408 communicates with device-specific hardware, except for the Ethernet hardware interface. Device hardware 410 may include sensors and other inputs, effectors or other outputs, and the like. The Ethernet hardware interface could be included in this layer, but is preferably accessible only from the TCP/IP stack. The main body 412 of the micro-server could comprise: micro-server-OEM API 414; micro-server-TCP/IP API 416; synthesized HTML 418; OEM data image 420; HTTP server 422; and TCP/IP based server 424.

Micro-server-OEM API 414 is an interface that could be used primarily by the OEM layer 408 to configure the micro-server and by the micro-server to exchange data with the OEM layer. The TCP/IP protocol stack could be used for communications over an Ethernet. TCP/IP protocol stack as used in this specification and the appended claims is not intended to be limited by the TCP/IP protocol. Rather, TCP/IP protocol is merely illustrative, and not intended to limit the scope of this invention to TCP/IP protocol. Other suitable protocols could be used without departing from the scope of this invention. Micro-server-TCP/IP API 416 is used by the micro-server to access the TCP/IP protocol stack 426.

Synthesized HTML 418 can contain a dynamic copy of the HTML version of the web pages served by HTTP server 422 to a client. OEM data image 420 can cache the OEM layer data in order to minimize callback requests from the micro-server. Stale OEM data can be automatically refreshed. HTTP protocol server 422, also referred to as HTTP server, can be used by the micro-server satisfy interactive HTTP request typically from thin browser-based clients. TCP/IP Based Server 424 could be used by the micro-server to satisfy TCP/IP based requests from clients executing default applets, manufacturer-supplied applets, client-side API software, or other TCP/IP-based software.

Each of the preferred embodiments is capable of five primary operating modes, as shown in the following table:

TABLE 6

Micro-Server Operating Modes

| Mode | Operating Mode | Client Software |
|---|---|---|
| 1 | HTTP Server | Standard interactive browser. |
| 2 | HTTP Server with Client-side Refresh | Standard interactive browser |
| 3 | TCP/IP Server | Default applet, OEM-provided applet, Client-side API, Custom client |
| 4 | TCP/IP Server with Server-side Push | Default applet, OEM-provided applet, Client-side API, Custom client |
| 5 | TCP/IP Pass-through | OEM-provided applet |

Figure 5:
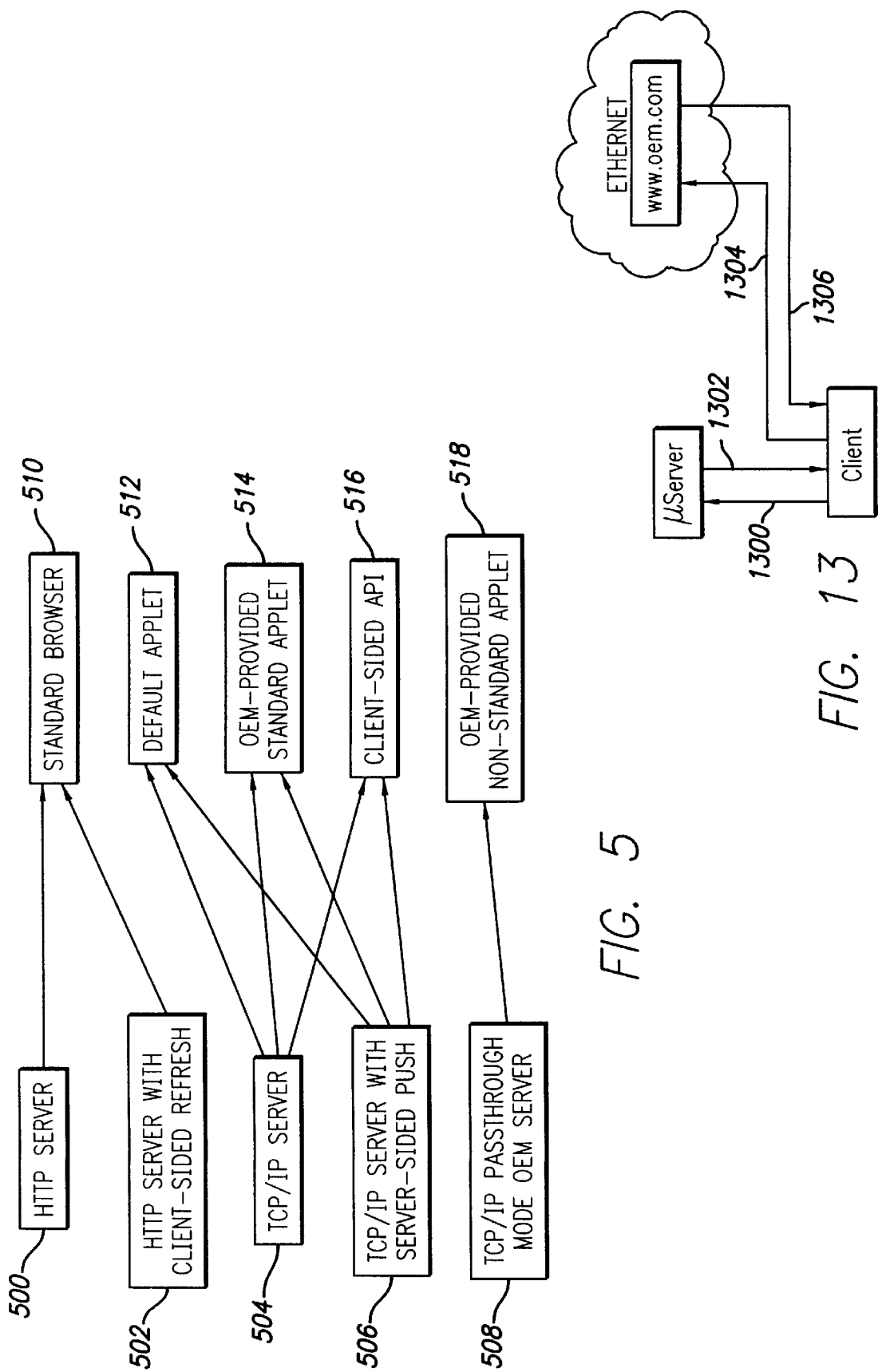
FIG. 5 illustrates several possible server/client types of combinations according to this invention.

FIG. 5 depicts several possible server/client types of combinations according to the principles of this invention. The five micro-server operating modes are depicted by the boxes on the left side of FIG. 5. They are: HTTP server 500; HTTP server with client-side refresh 502; TCP/IP Server 504; TCP/IP Server with server-side push 506; and TCP/IP pass through mode OEM server 508. The five operating modes function as follows.

HTTP server 500 is the most common mode used in interactive access to a micro-server-equipped device from a thin-client workstation running a web browser. When a user lands on a desired device's default page, an appropriate HTML description of the current state of the device is dynamically configured by the micro-server and the resulting page is displayed on the client work station's screen. This information is typically not updated dynamically, and the user typically would click on the browser's RELOAD button to cause an update to occur. As depicted in FIG. 5, HTTP server typically operates in conjunction with a standard browser 510. A standard browser could include, but is not limited to, Netscape Communicator or Microsoft Internet Explorer. Either of these products, as well as many others both commercially available and custom designed, are capable of providing a sufficiently interactive client interface to access micro-server pages.

HTTP server with a client-side refresh 502 is similar to the HTTP server mode 500 except that the page displayed in the browser is continually updated at fixed time intervals. HTTP server with client-side refresh will typically be available if the micro-server-equipped device has been appropriately configured by the user. This mode also typically depends on a client-side refresh configured into the HTML description of the page being viewed. HTTP server with client-side refresh 502 typically operates in conjunction with a standard browser 510, as shown in FIG. 5.

The TCP/IP server mode 504 is non-interactive. Data is exchanged between a client program on the remote workstation and a TCP/IP server within the micro server. As shown in FIG. 5, client applications which typically use this mode include: (1) a default client-side micro-server applet which determines the micro-server-equipped device's configuration and configures itself 512; (2) an OEM-provided applet which adheres to the standard micro-server TCP/IP application packet format 514; or (3) a micro-server client-side API application 516.

A default applet 512 is a software entity provided by an applet server. Once acquired by a client, it becomes a part of the client browser and it will typically be capable of displaying device data in a convenient, graphical manner. The default applet could be written according to a standard micro-server application-to-application protocol definition and could communicate directly with the TCP/IP server within a micro-server. Since this communication takes place within the micro-server, underneath the OEM API, which provides networking abstraction, it is typically invisible to the OEM layer.

An OEM-provided applet 514 is functionally equivalent to the default applet, but may provide a richer set of functions. It could be acquired from the OEM either directly or via an applet procurement agent. The OEM-provided applet could communicate with the micro-server in different modes. If written to the standard micro-server application-to-application protocol definition, it communicates directly with the TCP/IP server within the micro-server, just like a default applet discussed above. The OEM could also write the applet to use a different application-to-application protocol. In this case, the applet would communicate with the OEM layer via the TCP/IP pass through mode 508. This method would typically be discouraged because, under such circumstances, the micro-server would no longer provide full networking abstraction to the OEM software.

The Client-side API 516 is a software entity that can execute on the client machine and provide programmatic access to micro-server functions via an API. The Client-side API could use the TCP/IP server within the micro-server. In addition to handling ad-hoc requests from client applications, it is sufficiently intelligent to listen for broadcast messages from micro-servers to which it subscribes.

TCP/IP server with server-side push 506 is a mode similar to the standard TCP/IP server mode 504 but includes a limited push or broadcast capability to automatically initiate update data transfers to a limited number of selected clients. Data transfer destinations as well as trigger issues that initiate them may be user configurable. Judicious use of this option can result in significant savings in network traffic. As shown in FIG. 5, TCP/IP server with server-side push typically operates with the same types of client-side entities as the standard TCP/IP server mode.

TCP/IP pass through 508 is a mode intended for special cases outside of the scope of normal micro-server operation. A specific example of the use of this mode is a scenario in which an OEM supplied applet 518 is running under the client-side browser, communicating with a specialized TCP/IP server in the OEM application itself. In this scenario, the micro-server simply passes all received TCP/IP packets to the OEM application via a prearranged call back function and replies to the originating client with packets provided by the OEM software. This functionality is supported by the micro-server for completeness and is typically not preferred because it does not take advantage of the network abstraction provided by this invention. Similarly, custom applications could be written that would execute on the client and make use of the TCP/IP server within the micro-server. Although such a use of TCP/IP pass-through mode is possible, it is not preferred because it does not take advantage of the network abstraction provided by this invention.

Figure 6:
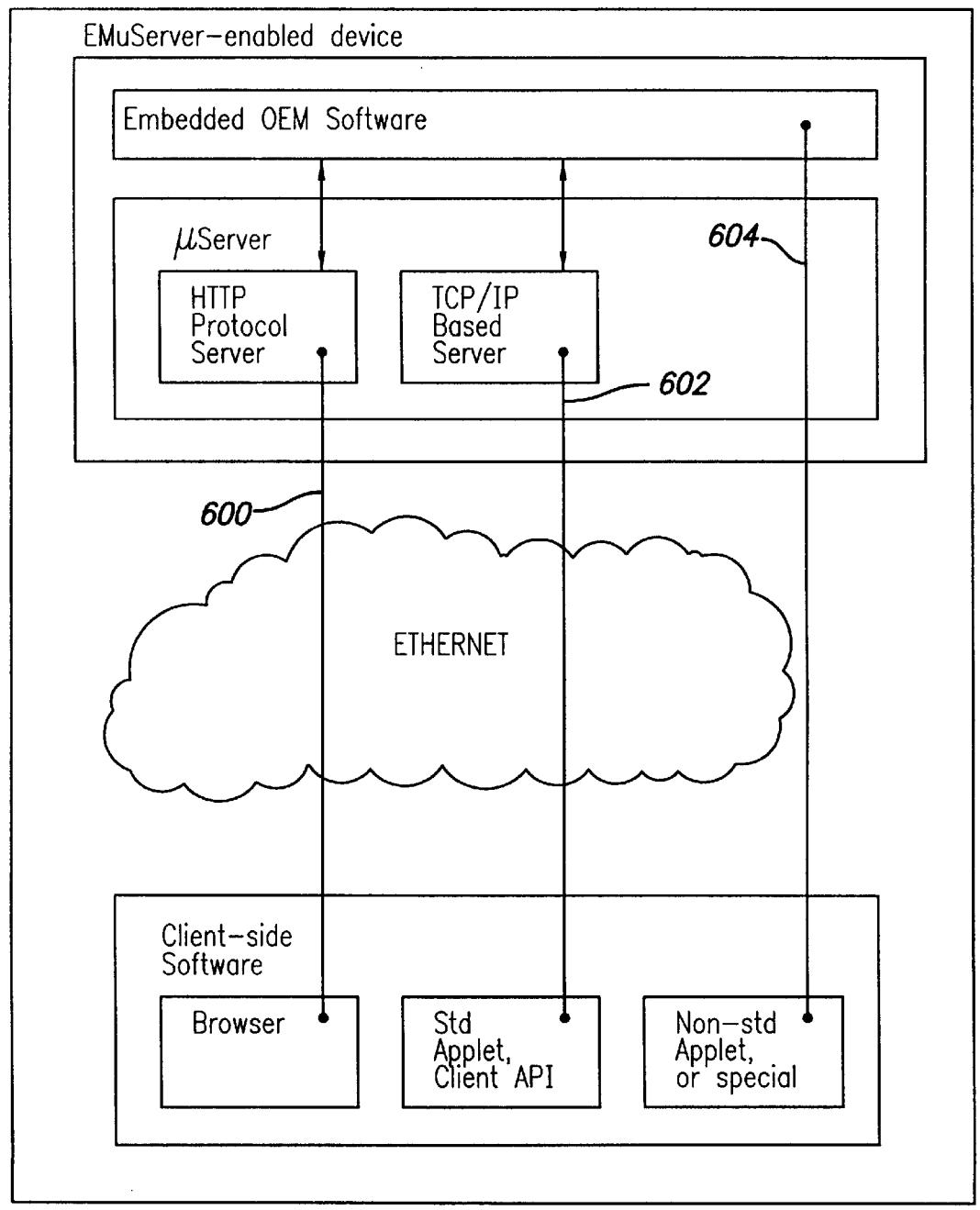
FIG. 6 illustrates three primary communication paths between a micro-server-enabled device and client-side software.

FIG. 6 illustrates that communications between the micro-server-enabled device and client-side software typically occur over three paths: (1) HTTP-protocol based communications between the HTTP server and the browser client, as shown at 600; (2) TCP/IP based communications between client-side default or OEM-supplied applets and the TCP/IP based server, as shown at 602; or (3) TCP/IP pass-through communications between the special client-side applications and the OEM software, with the micro-server acting as a pass-through intermediary, as shown at 604. While paths 600, 602, and 604 could all be used simultaneously by one or more clients, typically path 600 will be used most often, while paths 602 and 603 will be used less often than path 600.

A micro-server-enabled device could have five built-in web pages. These pages could all exist at the top level of the micro-server web site, so that accessing each would be easy. If no opening page is specified when a web server is browsed to, the web server opens a page called default.htm, also referred to as the site's home page. Another way to access the home page could by adding/read to the end of the URL. The home page for a micro-server-enabled device could publish the device's parametric data.

The control page is available by adding/control to the end of the URL. This page provides authorized persons access to the control functions, if any exist, on the device. For example, a servo-valve could be outfitted with the ability to set its flow rate from 0 to 100%.

The maintenance page is available by adding/maint to the end of the URL. This page could provide access to the maintenance functions and/or the maintenance record of the device.

The administration page is available by adding/admin to the end of the URL. This page is used by authorized persons to set operating characteristics of the micro-server such as the physical location name, the out-of-limits parameters for voltage, current, flows, and temperatures, push IP addresses, and the like. In general, it is used to tailor the device to its environment.

The discover page can be accessed by adding/discover to end of the URL. This page supplies information to clients during automatic discovery mode.

In order to clarify how the micro-server pages are accessed, assume that a unit has been configured with an IP address of 202.133.3.4. In addition, a local DNS server has mapped the same IP address to a URL of ServoValve37. Table 7 below demonstrates how the four pages are accessed either with or without the DNS server:

TABLE 7

Accessing micro-server Pages with or without DNS

| Micro-server Page | With DNS | Without DNS |
| --- | --- | --- |
| Home (Default) | http://ServoValve37 | 202.133.3.4/default |
| Control | http://ServoValve37/control | 202.133.3.4/control |
| Discover | http://ServoValve37/discover | 202.133.3.4/discover |
| Administer | http://ServoValve37/admin | 202.133.3.4/admin |
| Maintenance | http://ServoValve37/maint | 202.133.3.4/maint |

In order to simplify navigation, micro-server could automatically provide each page with links to the other four pages. FIG. 7 shows a typical micro-server page, in this case, a default page for a device controlling a Servo-valve. The screen is divided into two frames, the upper reflecting mostly static information and the lower containing the device read data. Buttons located on the left-hand side in the upper frame lead to the other four micro-server pages. As can be seen, the micro-server presentation can be very much like that of a standard page on the world-wide-web. This choice of presentation allows the use of client-side software, in this case a standard Netscape browser, which is familiar to most people. As will be apparent to those skilled in the art, the web pages presented in FIGS. 7–12 are representative of one possible implementation and other suitable implementations are also possible without departing from the scope of this invention.

In FIG. 7, the Auto Refresh feature is depicted as turned off in the upper right hand corner of the sample control page. Therefore, the page, as displayed in the browser, would remain static even though the device data may have changed. If the Auto Refresh feature were on, the page would be updated periodically. Underneath the Auto Refresh indication, the page contains both the current micro-server device time as well as the time of the last update. The latter refers to the time when the last set of data readings was obtained by the micro-server from the OEM layer. All data values are typically updated simultaneously.

The following fields shown in FIG. 7 would typically have been configured by the administrator, either via the Admin page or via the Client-side API: User Description; User Id; User Location; and Nominal, Low, and High Data Values for all device parameters. Once configured, these fields not only personalize the device but also change the way the micro-server reports data.

All device parameters are tagged with a unique identifier as depicted in the Id. column of the home page depicted in FIG. 7. Although not very important in the interactive presentation depicted in FIG. 7, this is a significant feature of the micro-server according to this invention. It allows parameter level access to micro-server data via the Client-side API. In addition, and also of significance, is the ability to access individual device parameters in other HTML constructs, allowing construction of alternate and/or hierarchical device and system views.

Figure 8:
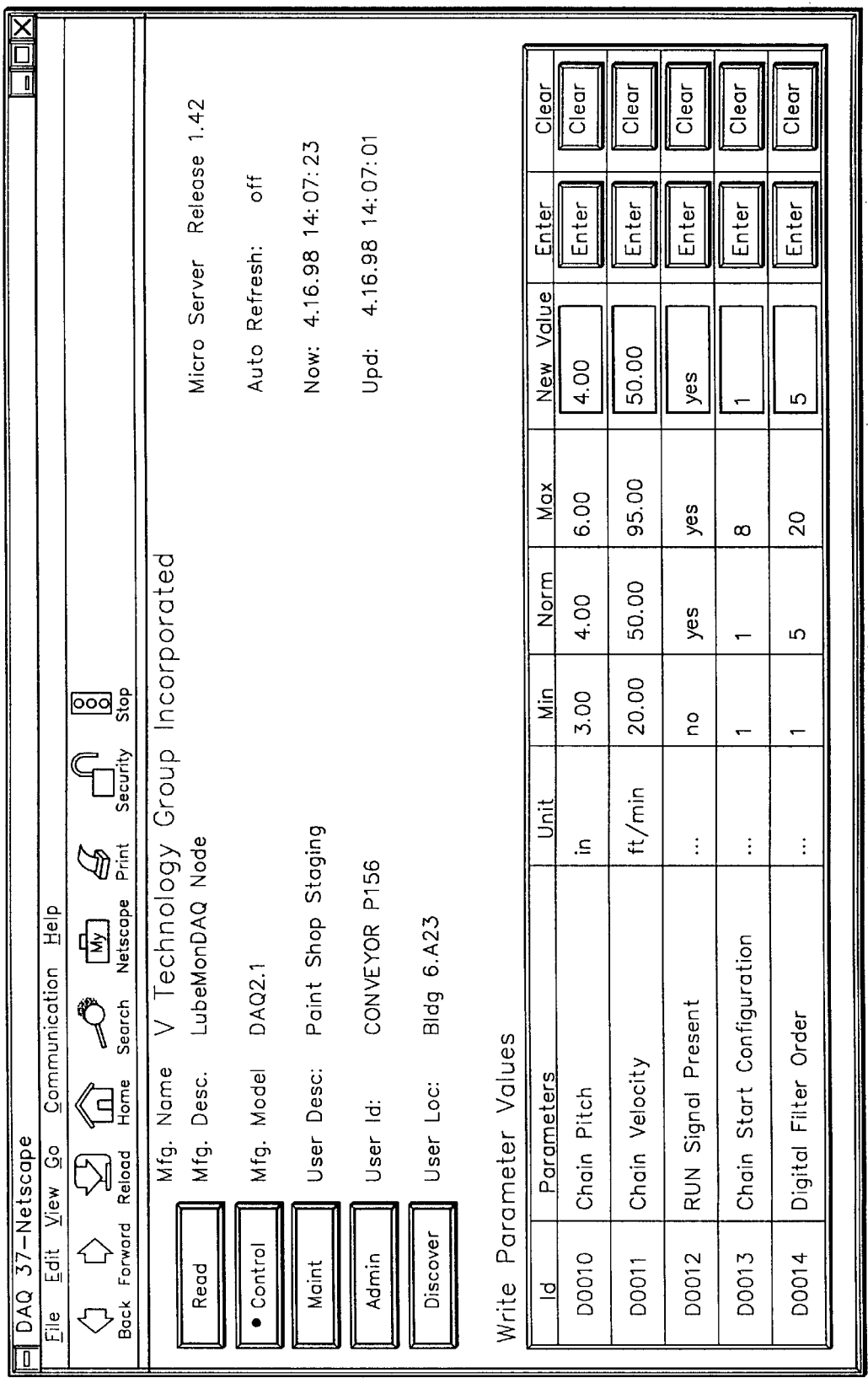
FIG. 8 is a sample Control page.

FIG. 8 depicts a sample control page. Any modifications of operating parameters could be subject to a security restriction imposed by a system administrator.

Figure 9:
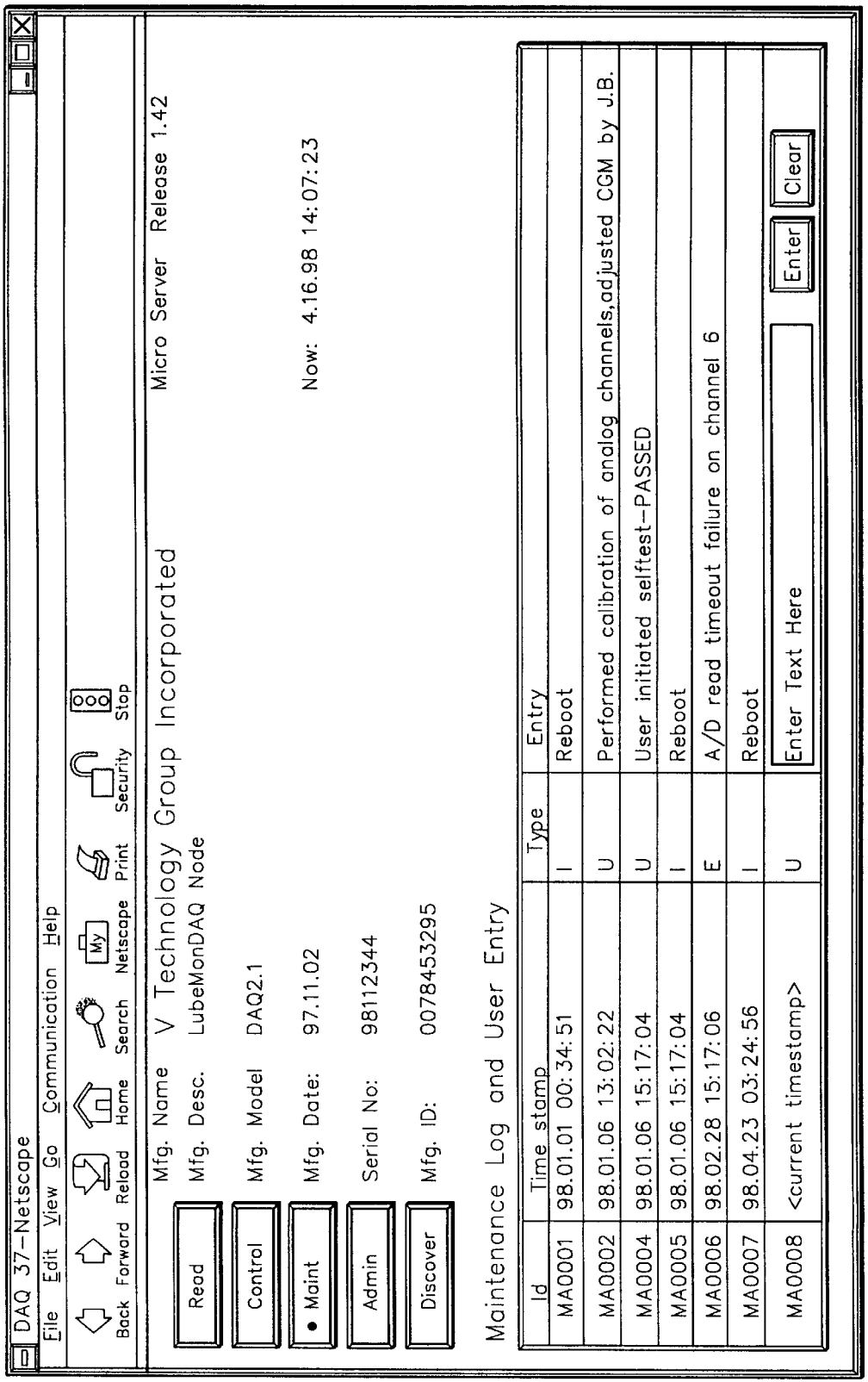
FIG. 9 is part 1 of a sample Maintenance page, also referred to as a Maint page.
Figure 10:
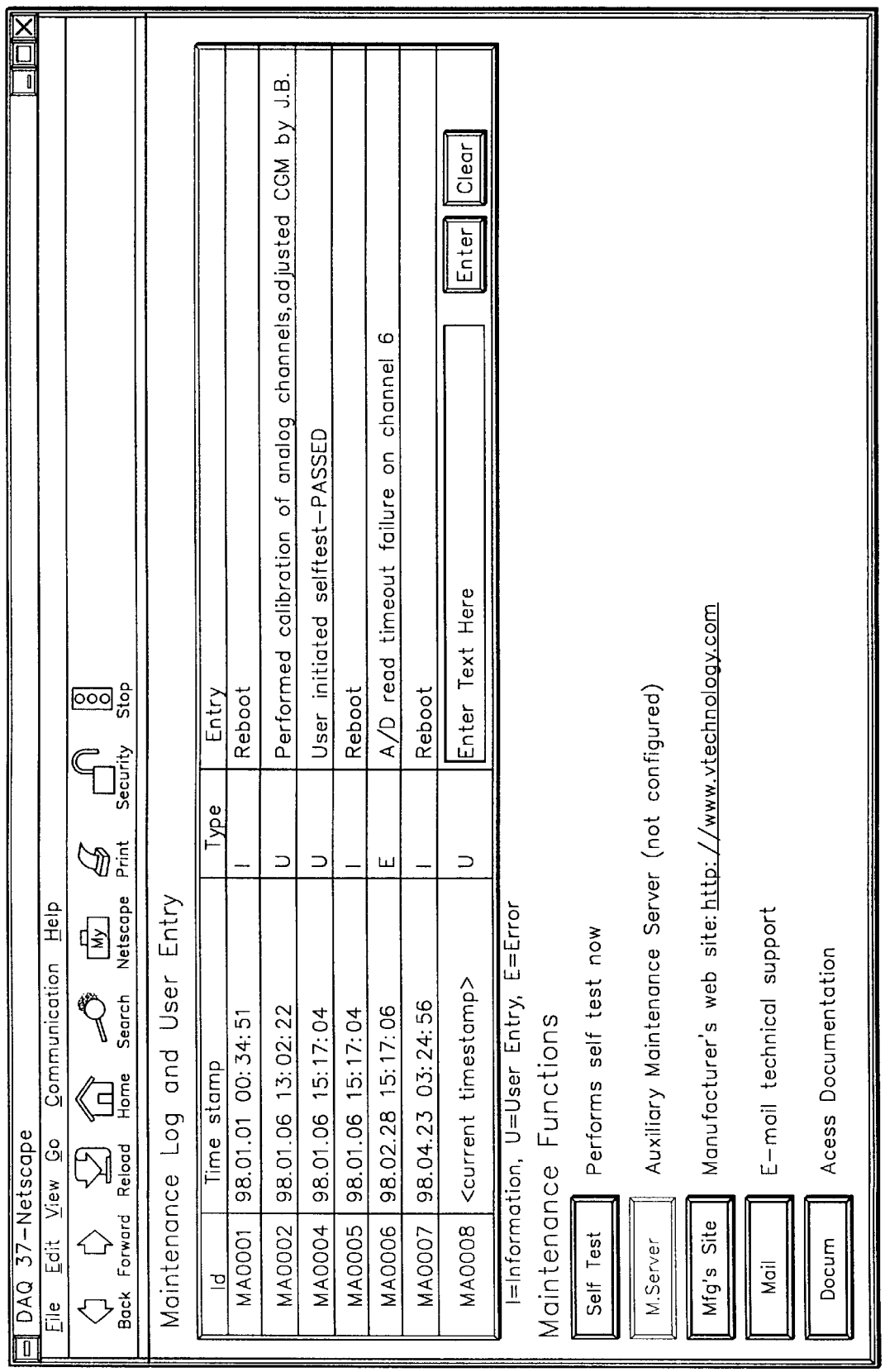
FIG. 10 is part 2 of the sample Maintenance page.

FIGS. 9 and 10 depict parts 1 and 2, respectively, of a sample maintenance page. The maintenance page could provide a very useful maintenance log that could be stored in non-volatile memory. If non-volatile memory is not available in the micro-server-enabled device, the maintenance log could be kept in a local maintenance server. The manufacturer's micro-server license Id. and the device's serial number, both of which could be available as micro-server variables, could form a unique identifier to be used in tracking the maintenance functions of the device.

Figure 11:
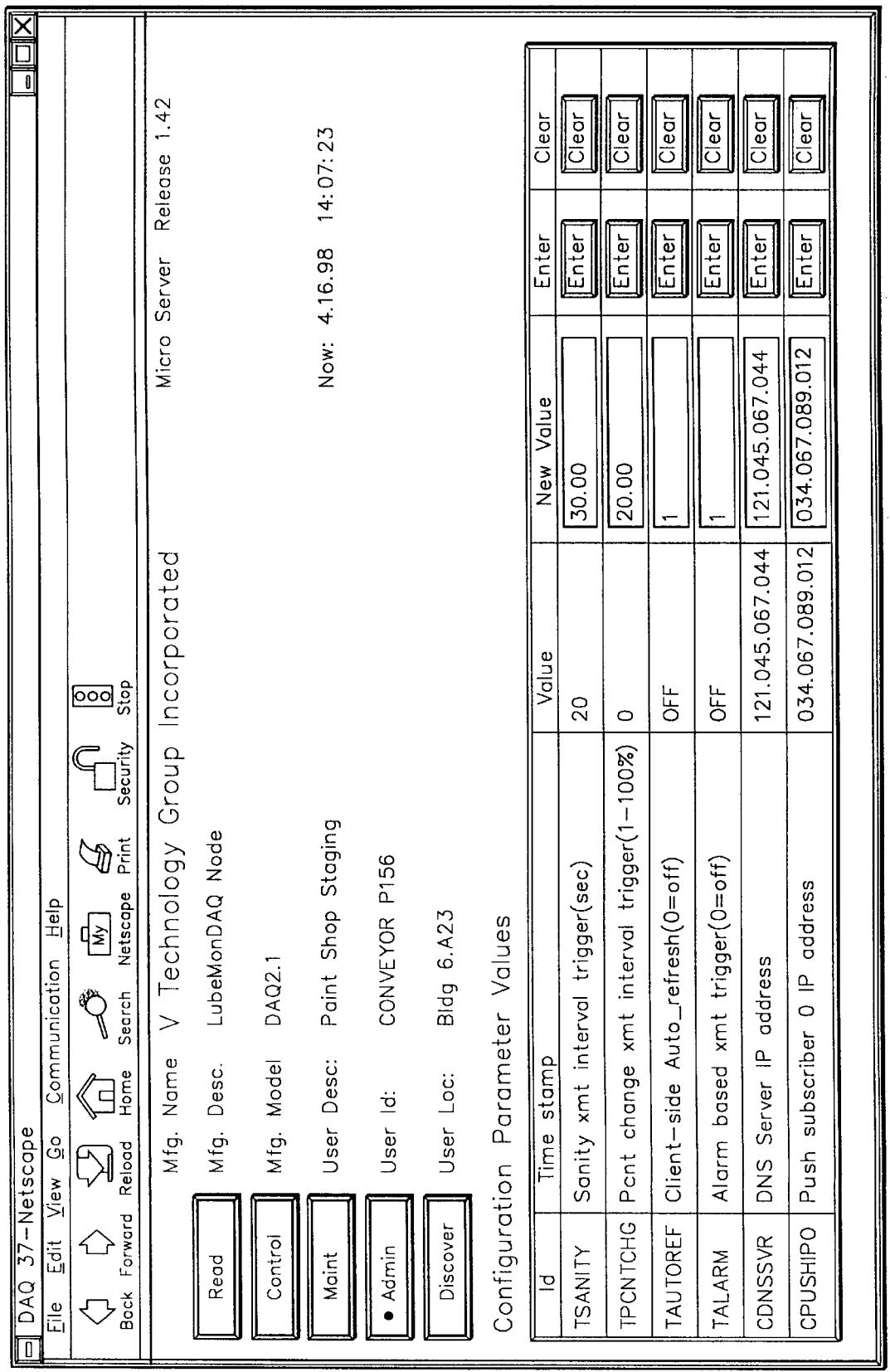
FIG. 11 is a sample Administration page, also referred to as a Admin page.
Figure 12:
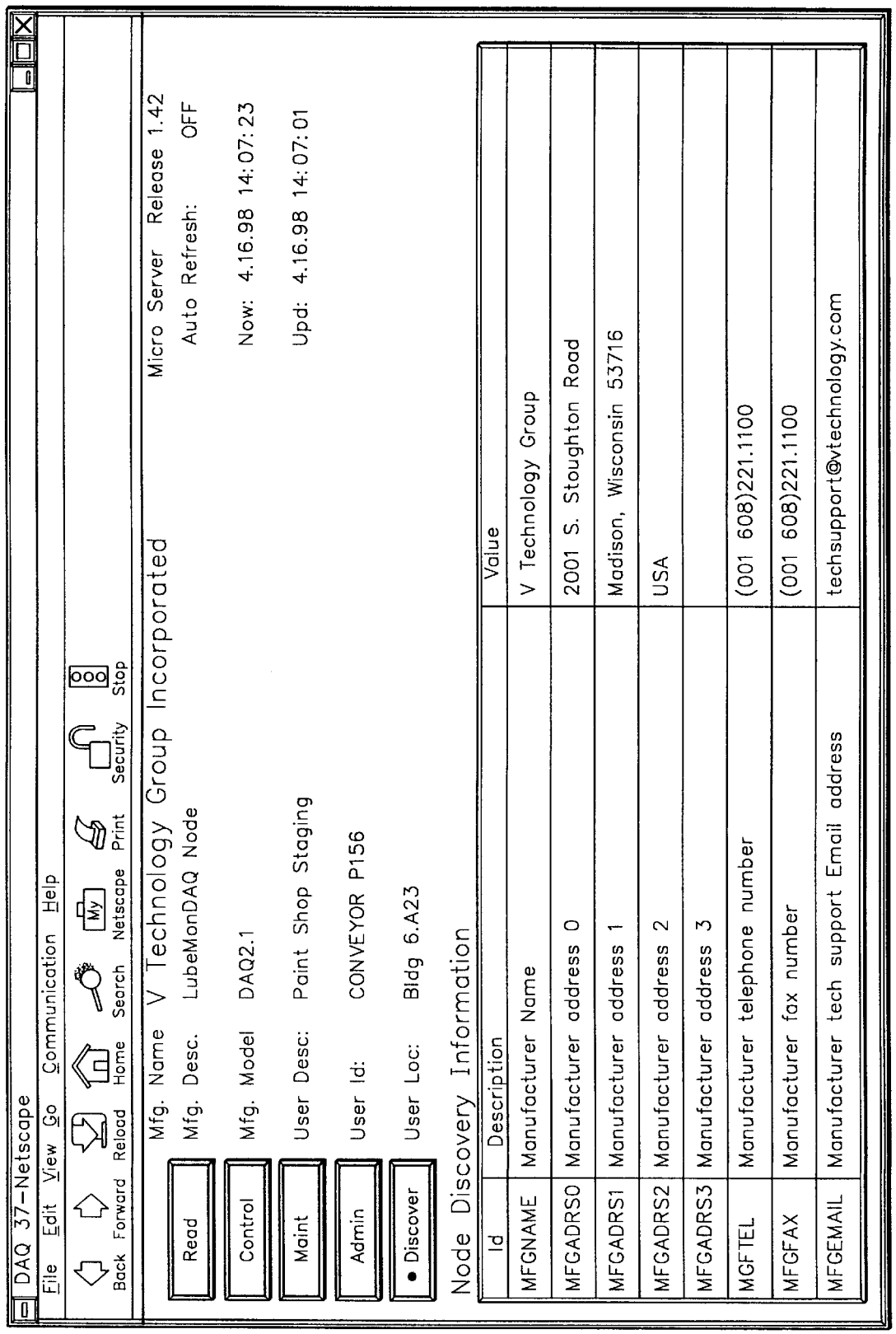
FIG. 12 is a partial sample of a Discover page.

FIG. 11 depicts a sample Admin page. FIG. 12 depicts a sample Discover page. The contents of the Discover page can be used by any authorized client to establish detailed understanding of a newly discovered micro-server-enabled device, for instance, a micro-server enabled device recently coupled to a network. Typically, micro-server variables uniquely identify important pieces of information related to the characteristics and the operation of the micro-server-enabled device. Micro-server variables may be used by the application-to-application protocol supported by the TCP/IP based server within the micro-server. Micro-server variables would typically be involved with the operation of the client-side API.

Web pages are expressed in HTML (HyperText Modeling Language) before they can be displayed by a browser. When a client browser lands on a given page, it requests the HTML description of the page to be sent. The HTTP server responds by sending the HTML and the browser, having received it, displays it on the client computer's screen. Upon receiving a request for HTML from a client, the micro-server makes appropriate calls to the OEM layer in order to retrieve appropriate data, constructs an HTML description of the requested page, and then sends the page to the client.

To reduce the micro-server's overhead of frequent calls to the OEM layer for retrieving data updates, the micro-server can cache OEM data. The cache may include a date/time stamp of the last update. Upon receiving an HTTP request from a browser client, the micro-server can check whether the data is available in the cache (it usually is, except for during startup) and then checks the cache timestamp. If the data is reasonably recent, no update is performed and the last version of the dynamic HTML is sent. If the data is stale, however, the micro-server can update it by performing the required callbacks to the OEM layer, update the cache and the associated timestamp, re-construct the HTML, and send it to the requesting client.

The maximum data latency for HTTP clients can be specified via the OEM API by calling a function defined by the OEM API. The maximum data latency is the maximum acceptable age of the data cached by the micro-server, as served to HTTP clients. It would typically be the responsibility of the OEM to make reasonable estimates for this parameter in order to reduce the overhead of frequent updates and re-construction of the HTML page description. For example, if the parameter measured by the micro-server-equipped device is temperature and the sensor has a limited frequency response, specifying a short latency time would be counterproductive because frequent data updates would not be necessary and would consume excessive resources.

Maximum data latency for TCP/IP clients is controlled via a different OEM API function call. This parameter is typically smaller than the maximum data latency for HTTP clients since TCP/IP clients are usually higher in performance and not subject to the delays of the human-machine interface such as in an interactive HTTP-based browser.

From the client perspective, a micro-server appears to be a normal, fully functional HTTP server executing on a conventional computer with a fully functional file system. The reality, however, could be quite different. A typical hardware platform could comprise an embedded processor without a real file system. Furthermore, the amount of non-volatile memory available to a micro-server could be quite small. In order to maintain full HTTP compliance, the micro-server, typically abstracts or hides a number of important details from the client, maintaining full browser compatibility.

In the preferred embodiments, by default, the micro-server will not broadcast any data unless the device has at least one registered subscriber and at least one trigger condition has been specified.

The configuration of server-side push could be performed interactively via the browser interface and the Admin page or could be performed via the TCP/IP application-to-application protocol. In either case, it could be subject to security checks. A subscribing client may choose to unsubscribe from broadcasts from any micro-server-equipped device by removing its host name or IP address from the subscription list. Such un-subscription requests could be subject to normal security measures. The broadcast data could be sent to the IP address of the subscribing host or hosts and a specified port, such as TCP/IP port 162. Client-side software entities which have registered their subscription with any micro-server-equipped devices would typically have to be listening to this port in order to receive the broadcasts.

In the pass-through TCP/IP mode, an OEM-supplied applet could be running under the client-side browser, communicating with a specialized TCP/IP server in the OEM application itself. In this scenario, the micro-server could pass all received TCP/IP packets to the OEM application via a prearranged callback function and could reply to the originating client with packets provided by the OEM software.

The OEM layer could use the OEM API to request the micro-server to set up multiple pass-through connections of this type, each with an arbitrary associated TCP/IP port number. The choice of the port number should not conflict with standard port numbers used by the micro-server or any other well known port numbers as defined in standard TCP/IP RFCs. The responsibility to use correct port numbers would typically lie with the OEM layer.

The micro-server is typically initialized each time power is applied to the device into which it is embedded or to which it is associated. The sequence of events could proceed as follows: (1) power is applied to the device; (2) the OEM layer is bootstrapped; (3) the OEM layer performs various initializations (other than initialization of the micro-server); (4) the OEM layer retrieves the IP address of the device from appropriate hardware such as a dip switch, or the like; (5) the OEM layer begins the micro-server initialization; (6) the OEM layer performs the micro-server initialization via the OEM API, passing the micro-server the IP address; (7) the OEM layer terminates micro-server initialization; (8) the OEM layer makes arrangements to start the micro-server execution thread; and (9) the OEM layer initiates its normal execution. With respect to step (4), alternately, a dynamic IP address assignment could be obtained from a local DHCP server.

The micro-server is typically not operational until the initialization has completed and an execution thread has been arranged for it, at which point, it typically starts operating normally.

Auto-discovery enables new micro-server-enabled devices to become useful immediately after plugging them into a network. Auto-discovery typically occurs in two separate steps: (1) new devices are automatically discovered by an auto-discovery and view server that scans the network for new devices. The scans can be configured to occur periodically or can be run on-demand. Once discovered, a new device can be automatically inserted into the main view on the server and can be accessed simply by clicking on its name. This operation could cause the client browser to be transferred to the device's home page; and (2) an automatic attempt can be made to load an OEM provided viewing/control applet to the client computer. If this operation succeeds, the applet can become operational immediately. If the attempt fails, however, a default applet can be loaded from the Local Applet Server. The applet can be initiated, causing it to perform the second, detailed discovery of the node itself. The TCP/IP application-to-application protocol is used to glean from the node, information about its characteristics, variables, recommended settings, etc. The same information could be presented in human-readable form on the device's discover page.

An OEM could configure the micro-server to include standard HTML links to relevant device documentation located on an OEM web site or some other web site associated with the device. This configuration of the micro-server could take the form of a simple call to the micro-server via the OEM API.

This call could result in a Documentation link created on the device's Maintenance page. Immediate and seamless access to on-line documentation, including drawings, specifications, parts lists, and manuals, of any micro-server-equipped device could be provided simply by clicking on the Documentation link on the device's maintenance page from any client browser. FIG. 13 illustrates how this could work.

In the preferred embodiments, access to online device documentation located on the OEM's web site could be a four-step process, as illustrated in FIG. 13. First, the user could click on a Documentation link created on the device's Maintenance page, as indicated by arrow 1300. Second, the URL of the documentation could be sent back to the client browser by the HTTP server component of the microserver; as shown by arrow 1302. Third, the browser could request the documentation, as specified by the URL, from the OEM's website, as depicted by arrow 1304. Fourth, the browser could load the requested documentation from the manufacturer's site as shown by arrow 1306. Advantageously, although the online documentation exists on the manufacturer's web site, the hyperlink provided on the micro-server maintenance page makes it appear that the documentation actually resides in the device itself.

The operation of the micro-server could be language independent. Object files containing the fixed string content for various languages could be provided. Parameter description strings, maintenance log entry strings, etc., as passed to the micro-server via the OEM interface, could be language independent. In addition, a country code could be supported for configuring certain internationalization features, including, but not limited to, regional seasonal time shifts. In an appropriately configured micro-server, simultaneous multilingual operation is possible. Similarly, a micro-server could be configured to report time to each client in each client's local time.

Time could be maintained as Universal Coordinated Time (UTC). The time information could be obtained via an appropriate API interface advertised to the micro-server via the OEM interface. Although the notion of UTC may not necessarily be needed in a given application, it could be extremely useful when coordinating real time information from multiple sources.

If an IP address or a hostname of a local time server has been specified, the micro-server could attempt to obtain local time information directly and adjust its clock accordingly. If a local time server is not available and the country code has not been set, the micro-server could be configured with the values of the time difference from UTC and any local/seasonal time offset. Regardless of how the date and time are originally set, they could continue to be available as both UTC and local values.

The micro-server's notion of time could based on local time obtained from system services and corrected with a local offset in hours from UTC contained in a variable TZ1. Application of the offset could provide the local time. The notion of daylight-savings time as well as any special regionally-based time offsets could be handled by a time internationalization function within the micro-server, resulting in an appropriate value of a variable, TZ2. This function could be used in the event that a timeserver could not be accessed on the subnet. The local time could be obtained by summing the UTC with TZ1 and TZ2, as follows:

$T_{local} = T_{UTC} + TZ1 + TZ2$

If a local time server is not available and the country code has not been set, the micro-server could be configured with the values of the time difference from UTC and any local/seasonal time offset (variables TZ1 and TZ2).

The micro-server could use hostnames, IP addresses, and URLs, in different contexts. IP addresses are, effectively, hardware addresses of computers communicating over Ethernet. The micro-server could use IP addresses to specify addresses of clients subscribing to automatic data updates (Server-side push), the address of a local Timer Server, and the like.

In all cases where a machine has a specific name, for example, Bldg45_host, that name could be used in configuring the micro-server. This approach could provide added flexibility, since the IP addresses of a given machine can be changed without the need to re-configure micro-server-equipped devices which reference it. To accomplish this, the micro-server could make use of a DNS (Domain Name Service) in order to look-up the IP address of a host. This service could be provided by a DNS server connected to the same network as multiple micro-servers. In order to use the DNS service, micro-servers could be configured with an IP address of a local DNS server.

URLs, or Uniform Resource Locators, are typically addresses of a specific file or another Internet resource. They are typically formed by adding a file pathname to the address of the device. The hostname or an IP address can be used as a base-name for the path, for example VTG_applets/servovalves/GWLinc/model3500, or 124.67.98.1/servovalves/GWLinc/model3500. URLs could be used by a micro-server to point to items such as manufacturer documentation for a specific device, an Applet used to view the device's data, and the like.

A micro-server could support Parameter level URL (PURL). A PURL can be used to reference a particular parameter published by a micro-server-equipped device. For example, the PURL slurrypump3/da0013.dat,value could refer to the value of data parameter 13 on micro-server called slurrypump3. Similarly, 128.45.33.11/mfgname.dat could return a string containing the manufacturer name of the micro-server-equipped device at IP address 128.45.33.11. The qualifier which follows the comma (,) separator could be an additional part of a request to specify an attribute of the parameter to be retrieved.

The operation of micro-server-enabled devices could be augmented by several additional software components such as: Default Applet Server; Time Server; Maintenance Server; Auto-discovery and View Server; Applet Procurement Server; and Local Applet Server/Procurement Agent.

While applets are not necessary for accessing micro-server-equipped devices with a browser, the Default Applet Server could provide default applets for interfacing with micro-server devices from within a standard client browser. The default applets could be used in situations where either (1) the manufacturer did not provide a specific viewing/control applet, or (2) the applet cannot be reached because of insufficient network connectivity. The server could contain standard default applets and distribute them, if necessary, to the browser clients. This operation could be handled by an applet procurement script embedded into the HTML code loaded from the micro-server-enabled devices.

The Time Server could provide the current UTC time to the requesting micro-server nodes, upon request. In addition to the UTC time, it could provide the hour offset from UTC and a second local time offset. Both offsets could be in hours. The Time Server could present a standard micro-server interface, in which case its services could be accessed by any software client via the standard client-side API.

The Maintenance Server could be a specialized entity used to provide maintenance logs for those micro-server-enabled devices that have a very limited amount of, or no, non-volatile storage. The server could essentially form an external repository for maintenance data hyper-linked to the device, so that the maintenance server's operation would be essentially transparent to the client.

The Auto-discovery and View Server could be a focal point of user access to a web of micro-server-enabled devices. The Auto-discovery and View Server could automatically discover micro-server devices within a given range of IP addresses. It could be run on demand or configured to run periodically to update the mappings. Auto-discovery could allow new micro-server enabled devices to publish device data simply by plugging the device into a network. The Auto-discovery and View Server could generate a local HTML master index page (Main View) of all devices, usable by a browser. This list could become a focal point for many users. Individual access points (URLs) could, of course, be book-marked on a user's browser in a manner well known in the art.

The Auto-discovery and View Server could generate a local database file (text, Access, etc.) with all device mappings, useable by other programs (applets, applications, etc). This list could be useful for configuring devices remotely.

The Auto-Discovery and View Server could allow the system administrator to configure system-wide monitoring and control panels that could present different views of any number of devices in the system. Each data point, or any other micro-server variable, could be monitored individually by referring to the variable's PURL. Once configured, views could be served-up to other clients and the data could be monitored live via the established views. Typically, an OEM applet would be available either locally or from the OEM server and would interact with the Auto-discovery and View Server.

The Local Applet Server could locate and retrieve device-specific applets from an OEM's server and make them available on a local facility server for access by clients. If direct Internet access is limited due to restricted connectivity, the Local Applet Server could attempt to procure the correct applets from the manufacturer via electronic mail. Once the applets are procured, they could be cached on the Local Applet Server. If the applets cannot be procured, and before they can be successfully procured, the Local Applet Server could use a substitute default applet. Once loaded on the client machine, the default applet could perform detailed discovery of the device. References to these client applets could occur on the micro-server pages that are served up. Since the applets are usually cached on the client machines, the overhead required to load them would typically be experienced only on initial use.

There are several types of client software which could interact with the micro-server. They are Standard Browser; Client-side API; Standard Applet; OEM-provided applet; and Custom Software.

Any standard browser (Netscape, Internet Explorer, etc.) running on any workstation platform (WINDOWS) 95/NT, UNIX, etc.) can be used to interact with micro-server-enabled devices or any of the servers listed above. OEM-provided viewing/control applets could be automatically loaded if desired. The location of a thin browser is essentially irrelevant. It could be connected to the same sub-net as the devices or it could access the network remotely. The workstation used to interact with a device can be chosen ad-hoc, since no special software is needed.

The purpose of the client-side API is to provide program access to the micro-server-enabled devices and other servers. It could allow custom monitoring and control applications to be developed and executed on the client, with full access to the device and server data. The client-side API could provide multi-threaded access to micro-server-enabled devices and servers. It could be used by standard OEM-provided viewing/control applets as well as by the default applets. The client-side API calls could allow reading and writing of individual variables from/to a specified device, subject to configurable security restrictions, and it could perform auto-discovery of devices that it communicates with. The client-side API code could perform local caching of device data. This would reduce network traffic since some of the program data requests, depending on requested priority, could be satisfied locally.

OEM-provided applets could be interactive viewing/control software modules that could be automatically loaded into the client browser from the OEM web site. This operation can be totally transparent to the client.

OEM-provided applets could be matched to the micro-server-enabled eliminating any need to perform detailed discovery. Such applets could check and validate the device OEM release level and disable themselves if they were no longer current. The applet procurement mechanism could then be re-activated, repeating the above cycle.

Default applets could be general purpose in nature, perhaps lacking some of the features of OEM applets. They would typically be uniform in appearance and devoid of the personalization of OEM applets. Default applets could be obtained from the local applet server.

Custom software developed for the client could use the client-side API to communicate with micro-server-enabled devices or servers.

The micro-server software is comprised of multiple tasks, referred to as threads. The individual threads are preferably maintained by the micro-server software itself. The micro-server software typically does not block, since that would likely interfere with operation of the OEM code which is responsible for operation of the micro-server-equipped device itself. The micro-server software typically gains processor control periodically and preferably relinquishes such control as soon as is reasonably possible.

The micro-server could run only when it is called at one of its standard entry points. The initialization API calls could account for the majority of these and could be used to configure the micro-server software based upon the device in which the micro-server software is embedded or with which it is associated. The OEM code could make these calls upon each bootstrap.

Figure 14:
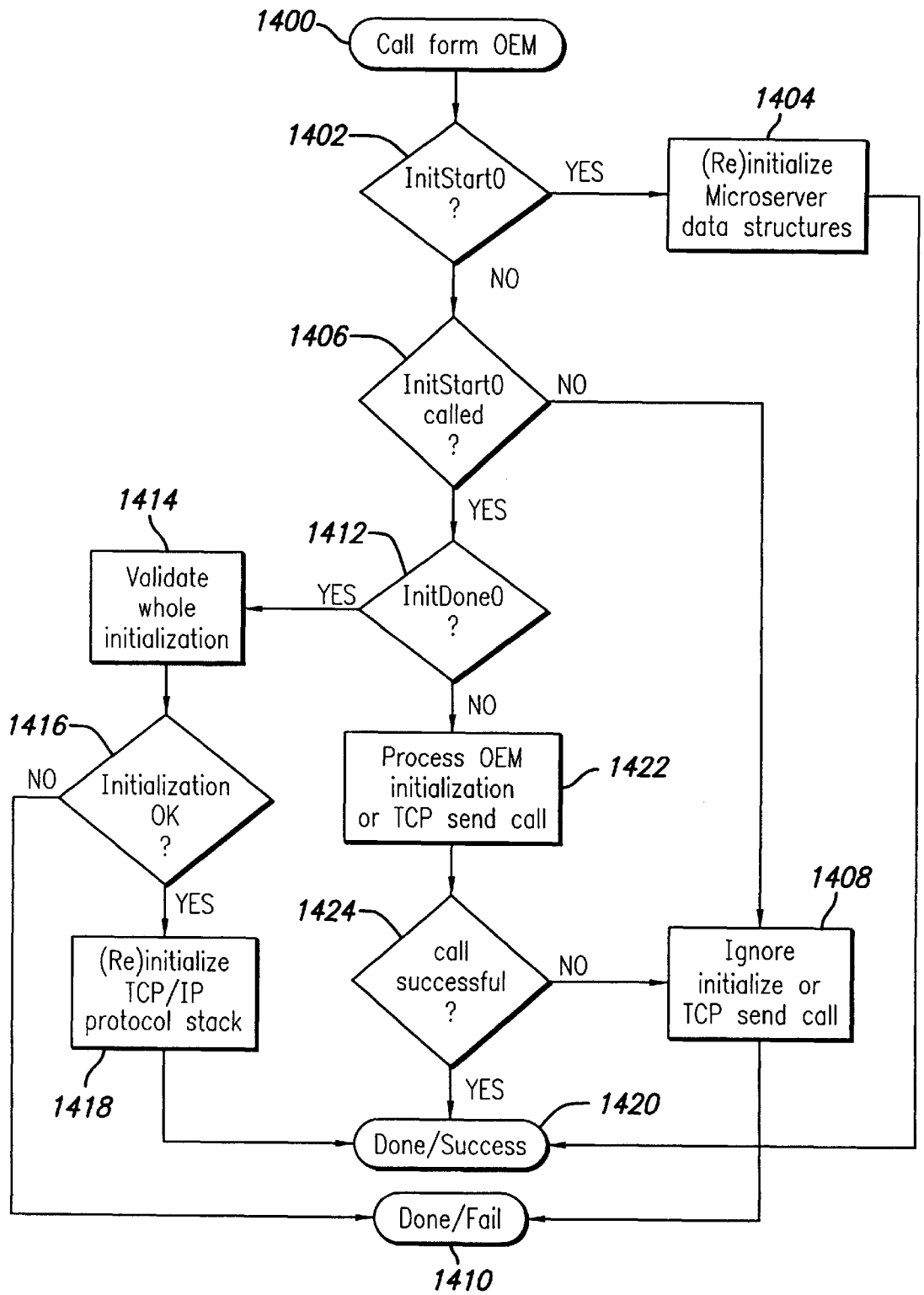
FIG. 14 is a simplified flowchart illustrating processing performed by a micro-server during micro-server initialization.

Referring to FIG. 14, processing is depicted as being initiated by the OEM software layer at 1400. If the OEM software layer has called us_InitStart(), the software begins the initialization process, as shown at 1402, 1404, and 1420. If us_InitStart() has not been called, any other initialization function calls are simply ignored, as indicated at 1406, 1408, and 1410.

The OEM code calls us_InitDone() to signal the end of initialization, triggering validation of the initialization sequence, as shown at either 1412, 1414, 1416, and 1410 or 1412, 1414, 1416, 1418 and 1420. When the OEM layer calls us_InitDone(), the micro-server could validate the entire initialization sequence as shown at 1414. If the initialization sequence was successful, the TCP/IP protocol stack can be initialized to enable communications, as shown at 1416 and 1418. The TCP/IP stack could be responsible for the initialization of the underlying TCP/IP hardware, the detailed workings of which are abstracted from the OEM layer by the micro-server. A call to us_InitStart() could clear all of the micro-server data structures and could be the first step of the initialization process. Any OEM call with inappropriate arguments could cause a failure.

If the call was neither us_InitStart() nor us_InitDone(), then it could be processed as either an initialization call or a TCP passthrough request being made by the OEM code, as shown at 1406, 1412, and 1422. TCP passthrough requests could cause the micro-server to blindly pass TCP/IP requests through. The validity of the call could be checked. Arguments and context could be validated for both initialization and TCP passthrough calls. If all is well, the return code could inform the OEM accordingly, as shown at 1424 and 1420. Similarly, any errors could result in an appropriate error code being returned, as shown at 1424, 1408, and 1410.

Figure 15:
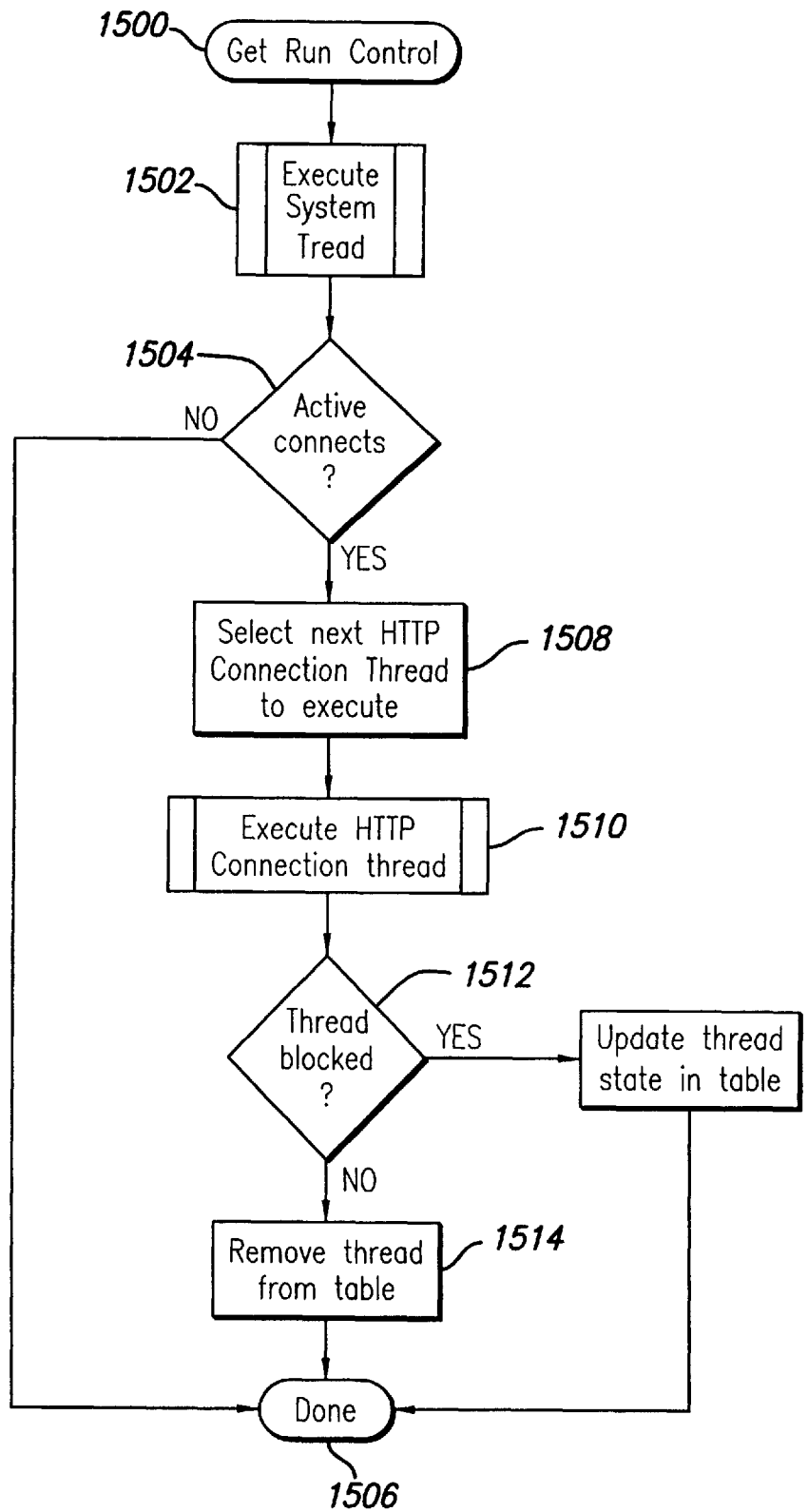
FIG. 15 is a simplified flowchart illustrating processing performed by a micro-server while getting run control from the device with which it is associated.

Referring to FIG. 15, the micro-server could gain control via an explicit call from external software, as shown at 1500. This could occur via an explicit call to the function us_Run() made periodically from the OEM software or from an interrupt service routine tied to a timer. This is the principal entry point for post-initialization processing by the micro-server. Once entered, the micro-server could execute a system thread, as depicted at 1502, and one thread associated with an active HTTP connection, if any exist. The details of the system thread are presented in FIG. 16. The entire execution point is preferably non-blocking in order to return quickly to the mainstream OEM software.

If there are no active HTTP connections, processor control can be returned to the OEM software, as depicted at 1504 and 1506. If there are active HTTP connections, the next HTTP connection thread to be executed can be selected from a process table, as depicted at 1508. Since there is at least one active HTTP connection thread, an HTTP connection thread can be executed, as depicted at 1510. The details of executing an HTTP Connection thread are presented in FIG. 18.

If the HTTP connection thread execution has completed, the HTTP connection thread can be removed from the process table and processor control can be returned to the OEM software, as depicted at 1512, 1514, and 1506. If the HTTP connection thread has not yet completed, for instance, because it is waiting for an external event, the HTTP's connection thread execution state can be retained in the process table.

Figure 16:
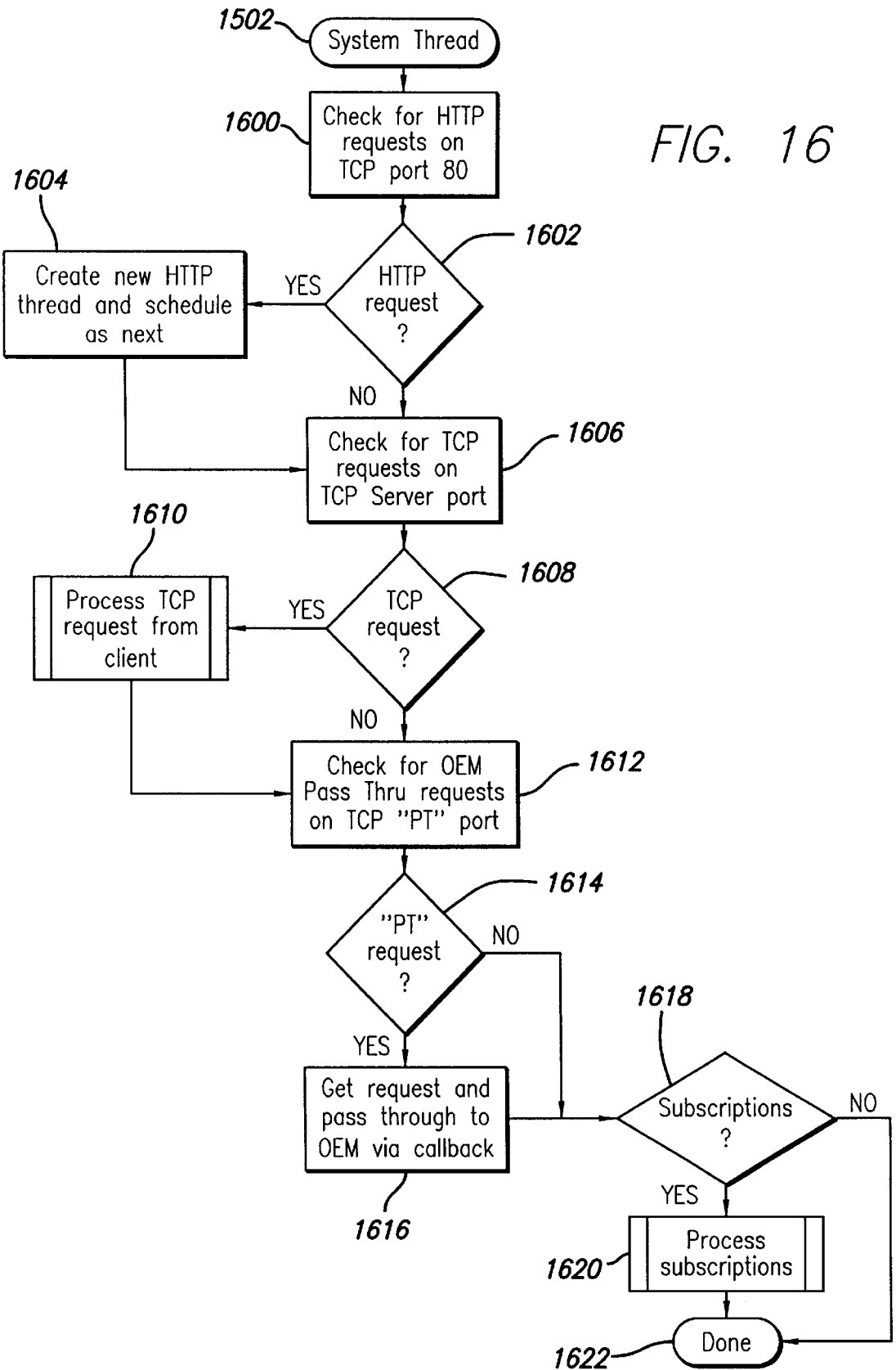
FIG. 16 is a simplified flowchart illustrating processing performed by a micro-server for executing a system thread.

Referring to FIG. 16, the System thread can be entered each time the micro-server software executes after initialization has been successfully completed. The system thread could perform all micro-server functions except handling HTTP connections. The System Thread could initially check for any HTTP requests on the TCP socket bound to port 80. Port 80 is the standard port for receiving HTTP requests originated by client browsers. If there is a pending HTTP request, a new HTTP connection thread could be created and scheduled as the next HTTP connection thread to be executed, as depicted at 1600, 1602, and 1604. New HTTP connections are preferably scheduled as high priority since accepting the HTTP requests as soon as they arrive allows the micro-server to process them more quickly.

Requests on the TCP server port originate from client entities other than standard interactive browsers and could be handled differently, according to a traditional client-server model, as depicted at 1606, 1608, and 1610. Such requests typically originate from client side applets or micro-server APIs. If there is a pending TCP client request, the TCP request could be processed and a response is sent to the originating client. Details of this process are presented in FIG. 17.

If there is a pending TCP pass-through ("PT") request on the ports specified by the OEM software during initialization, the TCP pass-through request is processed and passed to the OEM software via a callback function specified during initialization, as depicted at 1612, 1614, and 1616. Pass-through requests are literally passed through by the micro-server, in both directions, without interpretation.

If there are any subscribers, client subscriptions could be processed, as depicted at 1618 and 1620. Details of subscription processing are presented in FIG. 19. Subscribers are clients which have registered with the micro-server for automatic push notification upon the existence of certain triggers. As depicted at 1622, processor control is then returned to the Get Run Control thread depicted in FIG. 15.

Figure 17:
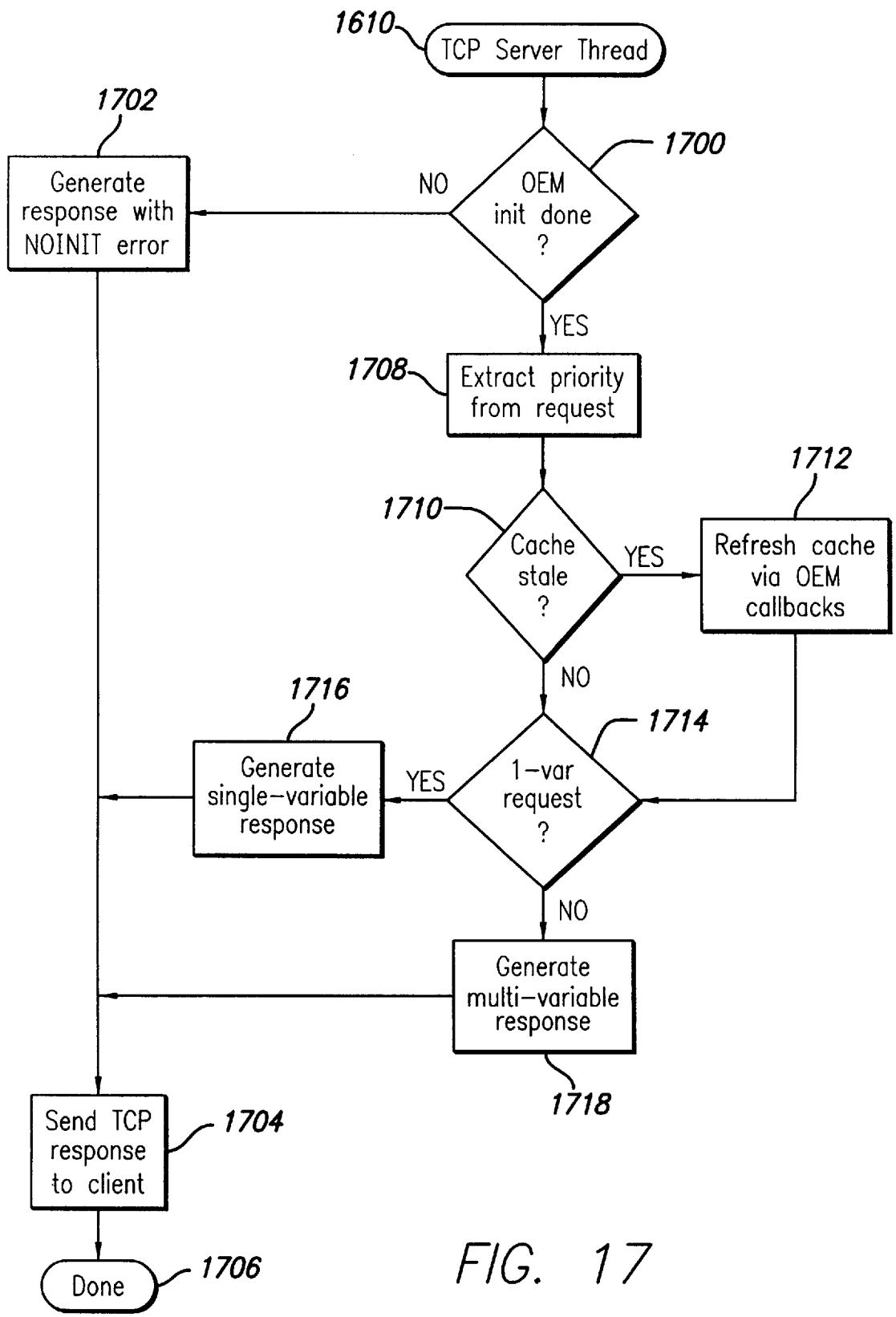
FIG. 17 is a simplified flowchart illustrating TCP server thread processing by a micro-server.

Referring to FIG. 17, the TCP server thread can process requests for data originating from non-browser clients. These clients typically are client-side applets or micro-server APIs. This thread can be entered from the System thread upon detection of the presence of such requests.

Initially, the TCP Server Thread could check whether OEM initialization of the micro-server has been successfully completed, as depicted at 1700. If not, as depicted at 1702, 1704, and 1706, an error packet could be returned to the originating client and control could be returned to the System Thread depicted in FIG. 16. If the micro-server has been successfully completed, the priority could be extracted from the client request, as depicted at 1708. The priority could be used to determine whether the data in the OEM data cache is sufficiently current to satisfy the request. The concept of request priorities and OEM data caching could be used to satisfy client requests with reasonably recent OEM data without having to get those data values from the OEM upon receiving each request. If the OEM data is stale (i.e., not sufficiently current), the cache could be refreshed by obtaining current OEM data via execution of callback functions specified during the initialization process, as depicted at 1710 and 1712. The cache could be time-stamped each time this happens.

If the client is requesting the value of a single micro-server variable, a single-variable response packet could be generated, as depicted at 1714 and 1716. If not, a multi-variable response packet could be generated, as depicted at 1718. As depicted at 1704, and 1706, the response packet could be sent to the originating client and control could be returned to the micro-server System Thread as depicted in FIG. 16.

Figure 18:
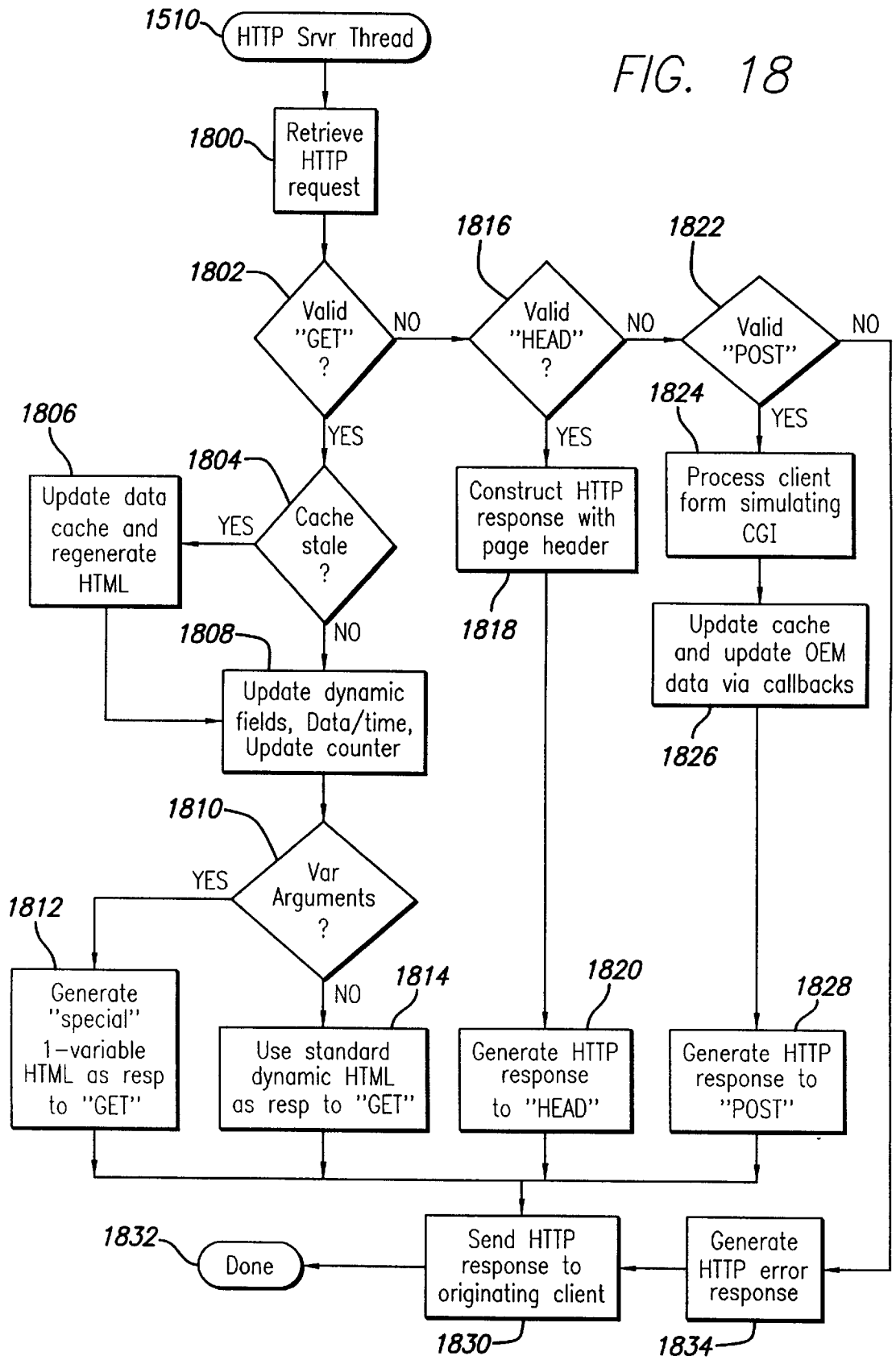
FIG. 18 is a simplified flowchart illustrating HTTP server thread processing by a micro-server.

Referring to FIG. 18, the HTTP server thread could be executed for each incoming HTTP request originated by a client browser or another HTTP-compliant entity. The HTTP server thread could be called from the micro-server Get Run Control thread depicted in FIG. 15. Only one HTTP connection thread is typically executed during a single invocation of the micro-server from the OEM software, with each subsequent execution processing the next active HTTP thread. The HTTP request could be retrieved from the TCP socket bound to port 80, as depicted at 1800. If the HTTP request is a valid GET request, the data cache could be checked for staleness, the data cache could be updated, if appropriate, and the HTML defining the requested document could be regenerated, as depicted at 1802, 1804, and 1806. Validation of a GET request could include validating the request format and the specified document. Using a standard file system paradigm, document pathnames could be resolved relative to internal micro-server data structures. Dynamic fields, such as the date, time, and an update counter could be updated, as shown at 1808.

If the document pathname specifies attributes of a micro-server variable, an alternate HTML document could be generated specifying the requested variable information, as depicted at 1810 and 1812. Otherwise, a standard response to the GET request could be generated including the requested document, as depicted at 1810 and 1814.

If the client request is a valid HEAD request, the HTML header information for the requested document could be constructed, as depicted at 1816 and 1818, and a complete HTTP response to the HEAD request could be generated, as depicted at 1820. The validation of HEAD requests can include validating the request format and the specified document. Using the standard file system paradigm, document pathnames could be resolved relative to the internal micro-server data structures.

POST requests could be used to write data to the micro-server. If a valid POST request is received, the micro-server could internally simulate a CGI server to process the request, as depicted at 1822 and 1824. If the data being written by the client affects OEM data, as opposed to exposed micro-server interface data, the OEM data cache could be updated and the affected OEM data values could be communicated to the OEM software via callback functions specified during initialization, as indicated at 1826. The HTTP response could be generated to the POST request, as depicted at 1828. The HTTP response could be sent to the originating HTTP client, as depicted at 1830. As depicted at 1832, control is then returned to the micro-server main run thread shown in FIG. 15. In the event of an error, the micro-server could construct a standard HTML error response specifying the appropriate error number and description, as depicted at 1834.

Figure 19:
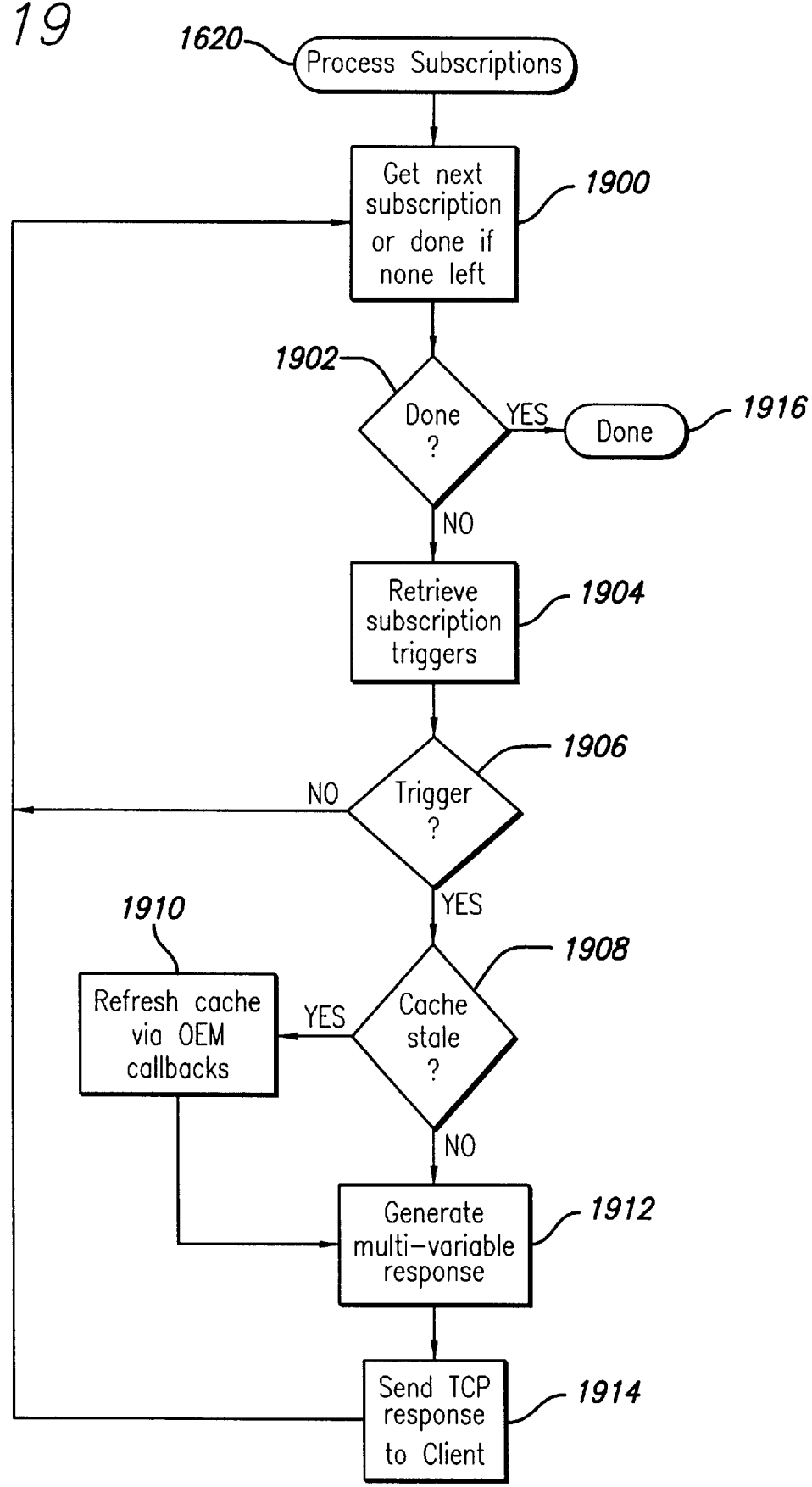
FIG. 19 is a simplified flowchart illustrating client subscription processing by a micro-server.

Referring to FIG. 19, subscription processing could be entered from the micro-server System thread, as depicted at 1620. Subscription processing's function is to send updates to subscribing clients. Initially, the next subscription could be retrieved from the subscription table, as depicted at 1900. Subscribers could be identified by their IP address. If there are any remaining subscriptions to be processed, the subscription triggers could be retrieved, as depicted at 1902 and 1904. Triggers are typically specified by subscribing clients. For example, a trigger could be based on an alarm on a specified data variable or an elapsed time period. If none of the triggers for the current subscriber have been satisfied, processing could proceed to the next subscriber, as depicted at 1906 and 1900. The OEM data cache could be refreshed, if necessary, as depicted at 1908 and 1910. The response to the client request could be generated and sent to the client's IP address, as depicted at 1912 and 1914. As depicted at 1902 and 1916, once all subscriptions have been processed, control could be returned to the micro-server system thread, which is depicted in FIG. 16.

APPENDIX A—Micro-Server OEM API Definition

The information contained in this section is an alphabetically organized listing of the micro-server OEM API. This API forms an interface between the OEM software layer and the micro-server itself. The API consists of several functional groups. They are:

Micro-server initialization with constant information

Micro-server initialization with initial operating parameters

Micro-server initialization with system services data

Micro-server initialization with device read/write data

For each of the functions comprising the OEM API, there is a synopsis of the call including the appropriate declaration, a narrative description, description of arguments, the return value, and associated usage notes.

us_DeleteMaintLog()

Micro-Server Operation

Description
    Deletes a message entry from the device maintenance log.
Synopsis
    #include <userver.h>
    int us_DeleteMaintLog(int message_id)
Arguments
    The following arguments are passed to this function:
    message_id message identifier obtained from a previous call to us_WriteMaintLog().
Return Value
    This function returns an identifier upon success and −1 upon failure. In the event of failure, the external variable Us_error contains an appropriate error code. Error codes are defined in userver.h.
Usage Notes
    This function is called to delete a text entry from the device non-volatile maintenance log. The entry would have been previously made by calling us WriteMaintLog(). If non-volatile memory is not present in the Micro-server-enabled device and the Micro-server has been remotely configured with a name or IP address of a local maintenance server, the deletion is made from the server log via an appropriate TCP/IP transaction.
See Also
    us_WriteMaintLog()

us_GetStatus()

Micro-Server Operation

Description
    Returns current Micro-server status
Synopsis
    #include <userver.h>
    int us_GetStatus(void)
Arguments
    none
Return Value
    This function returns a 16-bit bitmask representing logically ORed Micro-server status. Normal operating status is 0. Individual bit flags are defined in userver.h.
Usage Notes
    This call can be made in any context.
See Also
    us_Run()

us_GetVariable()

Micro-Server Operation

Description
    Returns a value of a variable
Synopsis
    #include <userver.h>
    char *us_GetVariable(char *var_name)
Arguments
    The following arguments are passed to this function:
    var_name Character string containing the name of the variable
Return Value
    This function returns a pointer to the value of the requested variable. The pointer should be immediately used since it will become invalid with a next call to any API function. If the variable name passed to the function is invalid, this function returns a NULL pointer.
Usage Notes
    This function is primarily used to retrieve values of variables set by the client, and its use is discouraged in normal operation. Values of data variables cannot be retrieved via this mechanism, since their variable names are dynamically assigned by the Micro-server code during initialization and, in particular, since their values are already known to the OEM layer. Any attempt to retrieve data variable values by "synthesizing" their names will yield unpredictable results.

us_InitDone()

Micro-Server Initialization

Description
Concludes the Micro-server initialization process.
Synopsis
include <userver.h>
int us_InitDone(void)
Arguments
None
Return Value
This function returns 0 (US_OK) if the initialization process has been performed correctly and −1 upon failure. In the event of failure, the external variable Us_error contains an appropriate error code. Error codes are defined in userver.h.
Usage Notes
Us_InitDone()should be the last of a set of calls performed to initialize the Micro-server. The server will not begin operation until the call is made with a value of US_OK returned to the caller.

us_InitMem()

Micro-Server Initialization

Description
Initializes the Micro-server memory
Synopsis
include <userver.h>
int us_InitMem(char *memory, unsigned long memsize, unsigned long diskspace, char *directory,)
Arguments
The following arguments are passed to this function:
memory Points to the first byte of a memory block to be used for Micro-server data space. The caller should insure that the address is word-aligned.
memsize Specifies the size of the data area available to Micro-server, expressed in bytes.
diskspace Specifies the amount of disk storage available for use by Micro-server. If the number is 0, Micro-server will not use disk I/O.
directory If the hardware environment in which Micro-server executes includes non-volatile disk storage, this argument should contain the path for the creation of Micro-server files, e.g. "c:\lus_files". If this argument is a null string, and diskspace is non-zero, Micro-server will create file(s) in the current directory.
Return Value
This function returns 0 (US_OK) upon success and −1 upon failure. In the event of failure, the external variable Us_error contains an appropriate error code. Error codes are defined in userver.h.
Usage Notes
If disk storage is not available in the execution environment, functions facilitated by non-volatile memory can still be used by making a call to us_Non Volatile().

See Also
us_NonVolatile()

us_Initstart()

Micro-Server Initialization

Description
Micro-server initialization process.
Synopsis
include <userver.h>
int us_InitStart(void)
Arguments
None
Return Value
This function always returns 0 (US_OK)
Usage Notes
Us_InitStart() should be the first of a set of calls performed to initialize the Micro-server. If the call is made again, initialization starts all over.

us_Non Volatile()

Micro-Server Initialization

Description
Informs the Micro-server about non-volatile memory present in the execution environment.
Synopsis
include <userver.h>
int us_NonVolatile(char memory, unsigned long memsize, void (*nvwrfunc)(), unsigned char (*nvrdfunc)())
Arguments
The following arguments are passed to this function:
nvmemory Points to the first byte of a non-volatile memory block to be used for Micro-server non-volatile data.
nvmemsize Specifies the size of the non-volatile data area available to Micro-server, expressed in bytes.
nvwrfunc Specifies the address to an OEM-supplied function, which returns a void, used to write a single byte of data to the nonvolatile data area. Micro-server assumes that the function is used as follows:
unsigned char written_data;
char *address;
nvwrfunc(address, written_data)
nvrdfunc Specifies the address to an OEM-supplied function, which returns an unsigned char, used to read a single byte of data from the nonvolatile data area. Micro-server assumes that the function is used as follows:
unsigned char read_data;
char *address;
read_data=nvrdfunc(address)
Return Value
This function returns 0 (US_OK) upon success and −1 upon failure. In the event of failure, the external variable Us_error contains an appropriate error code. Error codes are defined in userver.h.
Usage Notes
The OEM program should call NonVolatile() if disk storage is not available in the execution environment. If neither disk storage or non-volatile memory are available, Micro-server functions which require non-volatile memory will either not be available or will not be non-volatile.

The user program should define the nvrdfunc() and nvwrfunc().

us_Run()

Micro-Server Operation

Description
Passes control the Micro-server
Synopsis
include <userver.h>
int us_Run(void)
Arguments
none
Return Value
This function returns a 16-bit bitmask representing logically ORed Micro-server status. Normal operating status is 0. Individual bit flags are defined in userver.h.
Usage Notes
The purpose of us_Run() is to provide execution cycles to the Micro-server. This is the fundamental mechanism, which is used to operate the Micro-server. Under normal circumstances, the call to this function is made from within a loop in the OEM software layer. Alternately, the call can be made from an interrupt service routine for the real-time clock. The call is non-blocking, since the Micro-server adheres to "passthrough" architecture with no loops. Execution occurs on the stack in the current context.
See Also
us_GetStatus()

us_SetHttpLatency()

Micro-Server Initialization

Description
Sets up the Micro-server HTTP latency.
Synopsis
include <userver.h>
int us_SetHttpLatency(long latency)
Arguments
The following arguments are passed to this function:
latency HTTP latency in milliseconds
Return Value
This function returns 0 (US_OK) upon success and —1 upon failure. In the event of failure, the external variable Us_error contains an appropriate error code. Error codes are defined in userver.h.
Usage Notes
This function is called to set the HTTP latency. The HTTP latency is defined as the maximum allowable age of the OEM data cache for HTTP get requests from the client. If the client browser issue a get request for either the read or the control page, and the data in the OEM data cache is older than the latency period, Micro-server will call the specified callback functions to obtain the current data from the OEM software layer, thus refreshing the cache. The OEM data cache timestamp will be updated accordingly. The default value for the HTTP latency is 5000 ms.
See Also
us_SetTcpLatency()

us_SetTcpLatency()

Micro-Server Initialization

Description
Sets up the Micro-server TCP/IP latency.
Synopsis
include <userver.h>
int us_SetTcpLatency(long latency)
Arguments
The following arguments are passed to this function:
latency TCP/IP latency in milliseconds
Return Value
This function returns 0 (US_OK) upon success and −1 upon failure. In the event of failure, the external variable Us_error contains an appropriate error code. Error codes are defined in userver.h.
Usage Notes
This function is called to set the TCP/IP latency. The TCP/IP latency is defined as the maximum allowable age of the OEM data cache for TCP/IP requests from the client over the VTG application-to-application protocol. If the client software issues a request for any OEM data variables, and the data in the OEM data cache is older than the latency period, Micro-server will call the specified callback functions to obtain the current data from the OEM software layer, thus refreshing the cache. The OEM data cache timestamp will be updated accordingly. The default value for the TCP/IP latency is 100 ms.
See Also
us_SetHttpLatency()

us_SendTcpResponse()

Micro-Server Communication

Description
Used for TCP/IP dialog directly between remote client and user program, this function sends a response to a message originated by a remote TCP/IP client. This function is only used in the "passthrough" mode.
Synopsis
include <userver.h>
int us_SendTcpRepsonse(IPADDRESS originator, PACKET *packet)
Arguments
The following arguments are passed to this function:
originator Specifies the IP address of the originating client. This value will have been passed to the user code via the tcpreceive() function called by the Micro-server.
packet Pointer to the packet containing the response to send to the client
Return Value
This function returns 0 (US_OK) upon success and −1 upon failure. In the event of failure, the external variable Us_error contains an appropriate error code. Error codes are defined in userver.h.
See Also
us_SetTcpDialog()

us_SetIpAddress()

Micro-Server Initialization

Description
Micro-server IP address
Synopsis
include <userver.h>
int us_SetIpAddress(IPADDRESS address)
Arguments
Address is a 32-bit entity containing the IP address of the embedded Micro-server. One byte is allocated to each of the four (4) address components with the most significant 8 bits of address corresponding to the most significant IP address component.
Return Value
This function returns 0 (US_OK) upon success and −1 upon failure. In the event of failure, the external variable Us_error contains an appropriate error code. Error codes are defined in userver.h.

Usage Notes

The value of the IP address passed by the user to Micro-server is typically read from the embedded hardware constituting the execution platform, such as DIP switches. Before initialization, the IP address is set to a default value of 100.100.100.1.

See Also us_SetIpDHCP()

us_SetIpDHCP()

Micro-Server Initialization

Description

Initializes the Micro-server IP address via a remote DHCP server

Synopsis include <userver.h> int us_SetIpDHCP(void)

Arguments

None

Return Value

This function returns 0 (US_OK) upon success and −1 upon failure. In the event of failure, the external variable Us_error contains an appropriate error code. Error codes are defined in userver.h.

Usage Notes

The value of the IP address is determine by a remote DHCP server. This dynamic address assignment should only be used if the Micro-server-enabled device is accessed via a name resolved by a local DNS server.

See Also us_SetIpAddress()

us_SetMfgData()

Micro-Server Initialization

Description

Used to provide the Micro-server with manufacturer data. Multiple calls to this function are made to provide such data. Majority of the data is destined for the /discover.htm page of the server.

Synopsis include <userver.h> int us_SetMfgData(int id, char *value)

Arguments

The following arguments are passed to this function:

id Identifies the data passed in the value argument to the function. Header file "userver.h" contains manifest constants used for this value. Because these constants contain additional implicit information, they should always be used. Do not use constant values here. For example, US_MFGADR0 should be used instead of 2.

value Specifies the value of the field identified by id. The format of this argument is always a null-terminated string.

Return Value

This function returns 0 (US_OK) upon success and −1 upon failure. In the event of failure, the external variable Us_error contains an appropriate error code. Error codes are defined in userver.h.

Usage Notes

The following table specifies constant values that could be used with the id argument

| US_CAPLTSVR | Local Applet Server name |
| US_CMNTSVR | Maintenance Server name |

-continued

| US_CMYIPADRS | Device IP address |
| US_CTIMSVR | Local time server IP name |
| US_ICOUNTRY | Country code |
| US_MFGADRS0 | Manufacturer address 0 |
| US_MFGADRS1 | Manufacturer address 1 |
| US_MFGADRS2 | Manufacturer address 2 |
| US_MFGADRS3 | Manufacturer address 3 |
| US_MFGAPLURL | Manufacturer client applet server URL |
| US_MFGDATE | Device date of manufacture |
| US_MFGDOCURL | Manufacturer documentation URL |
| US_MFGEMAIL | Manufacturer tech support Email address |
| US_MFGFAX | Manufacturer fax number |
| US_MFGGENER | Manufacturer generic device description |
| US_MFGLNKMAIL | Manufacturer tech support Email link |
| US_MFGLOGO | Link to Manufacturer logo |
| US_MFGMODEL | Manufacturer device model number |
| US_MFGMSID | Manufacturer Micro-server License ID |
| US_MFGNAME | Manufacturer Name |
| Us_MFGPGMVER | Manufacturer Program Version |
| US_MFGSERNO | Manufacturer device serial number |
| US_MFGTEL | Manufacturer telephone number |
| US_MFGURL | Manufacturer general URL |
| US_MGGBACK | Manufacturer background | us_SetReadData()

Micro-Server Initialization

Description

Micro-server with data to be published to the network. The data is referred to as "read" since it is read by the client. Multiple calls to this function are made to provide such data, with one call made for each of the published data points. Majority of the data is destined for the /read.him or /default.htm page of the server.

Synopsis include <userver.h> int us_SetReadData(READDATA *ptr)

Arguments

The following arguments are passed to this function:

ptr Is a pointer to a READDATA definition structure initialized by the caller before the call to us_SetReadData(). Header file "userver.h" contains a declaration for this structure.

Return Value

This function returns 0 (US_OK) upon success and −1 upon failure. In the event of failure, the external variable Us_error contains an appropriate error code. Error codes are defined in userver.h.

Usage Notes

The calling program passes a pointer to a data structure containing the description of the read data field to be published. The data structure is declared as:

```
typedef struct    readdata
{
  char *description;  /* describes the parameter */
  char *units;        /* specifies the measurement units */
  char (*callback)(); /* call back function used to get value */
  char *lowend;       /* the low end of parameter value span */
  char *highend;      /* the low end of parameter value span */
  char *lowlimit;     /* recommended low limit for parameter value */
  char *highlimit;    /* recommended high limit for parameter value */
  char *nominal;      /* recommended nominal value for parameter */
} READDATA;
```

The callback element of the READDATA structure contains a pointer to a user-provided function that returns the current value of the data. The data is returned as a character string.

Note that the lowlimit, highlimit and nominal strings are advisory in nature. If the user program chooses not to specify them, they may be left blank (by assigning 0-length null terminated strings to corresponding structure elements. The Micro-server makes private copies of the user data, hence the READDATA structure may be re-used with a subsequent call to us_SetReadData().
See Also
   us_SetReadData()

us_SetWriteData()

Micro-Server Initialization

Description

Configures the Micro-server with control data to be published and accepted from the clients. The data is referred to as "write" since it can be written to the OEM layer by the remote client. Multiple calls to this function are made to provide such data, with one call made for each of the published data points. Majority of the data is destined for the /control.htm page of the server.

Synopsis
   #include <userver.h>
   int us_SetWriteData(WRITEDATA *ptr)

Arguments

The following arguments are passed to this function:

ptr Is a pointer to a WRITEDATA definition structure initialized by the caller before the call to us_SetWriteData(). Header file "userver.h" contains a declaration for this structure.

Return Value

This function returns 0 (US_OK) upon success and −1 upon failure. In the event of failure, the external variable Us_error contains an appropriate error code. Error codes are defined in userver.h.

Usage Notes

The calling program passes a pointer to a data structure containing the description of the read data field to be published. The data structure is declared as:

```
typedef struct    readdata
{
  char *description;    /* describes the parameter */
  char *units;          /* specifies the measurement units */
  char (*rdcallback)(); /* call back function used to get value */
  char (*wrcallback)(); /* call back function used to set value */
  char *lowend;         /* the low end of parameter value span */
  char *highend;        /* the low end of parameter value span */
  char *lowlimit;       /* recommended low limit for parameter
                           value */
  char *highlimit;      /* recommended high limit for parameter
                           value */
  char *nominal;        /* recommended nominal value for
                           parameter */
} READDATA;
```

The callback element of the WRITEDATA structure contains a pointer to a user-provided function that returns the current value of the data. The data is always passed as a character string.

Note that the lowlimit, highlimit and nominal strings are advisory in nature. If the user program chooses not to specify them, they may be left blank (by assigning 0-length null terminated strings to corresponding structure elements.

The Micro-server makes private copies of the user data, hence the WRITEDDATA structure may be re-used with a subsequent call to us_SetWriteData().
See Also
   us_SetReadData()

us_SetTcpDialog()

Micro-Server Initialization

Description

Initializes TCP/IP dialog directly between remote client and user program. This is necessary only in the "passthrough" mode.

Synopsis
   #include <userver.h>
   int us_SetTcpDialog(int port, void (*tcpreceive)())

Arguments

The following arguments are passed to this function:

portid Specifies the port number to be used in direct communications with the client. Keep in mind that the port may not conflict with the two primary ports are already used: US_SERVERPORT used by the Micro-server for handling HTTP protocol traffic as well US_TCPPORT used by the Micro-server for handling transactions involving client-side generic applets.

tcpreceive Specifies the address to an OEM function of type void, used to write pass a TCP packet received by Micro-server to the OEM software layer. Whenever a TCP packet is received on the specified port, Micro-server calls this function to pass the packet to the OEM software. Micro-server assumes that the function is used as follows:

IPADDRESS originator;
   PACKET *packet;
   tcpreceive(originator, packet)

Return Value

This function returns 0 (US_OK) upon success and −1 upon failure. In the event of failure, the external variable Us_error contains an appropriate error code. Error codes are defined in userver.h.

Usage Notes

The user program is responsible for providing the tcpreceive() function if this feature will be used.
See Also
   us_SendTcpResponse()

us_WriteMaintLog()

Micro-Server Operation

Description

Micro-server has been remotely configured with a name or IP address of a local maintenance server, the entry is made in the server log via an appropriate TCP/IP transaction.
See also
   us_deleteMaintLog()

We claim:

1. A system for providing information about a remote device to a client workstation, the system comprising:
   a micro-server for transmitting the information to the client workstation, the micro-server defining an application programming interface for interfacing with the remote device to access the information from the remote device and for abstracting the details of transmitting the information to the client workstation, the remote device initializing the micro-server by providing, via a function call defined by the application programming interface, at least one pointer to at least one callback function for accessing the information, the micro-server accessing the information by calling the at least one callback function.

2. The system of claim 1 wherein the micro-server comprises a TCP/IP application programming interface for accessing a TCP/IP protocol stack.

3. The system of claim 1 further comprising: a system services application programming interface for providing the micro-server with access to system services from the remote device.

4. The system of claim 1 wherein the micro-server comprises an HTTP protocol server for satisfying interactive HTTP requests from the remote client workstation.

5. The system of claim 4 wherein the micro-server comprises a synthesized HTML server for providing a dynamic copy of an HTML version of a web page served by the HTTP protocol server.

6. The system of claim 1 further comprising: a data image for caching data from the remote device for reducing the number of application programming interface function calls made by the micro-server to access remote device information.

7. The system of claim 1 wherein the micro-server comprises: a TCP/IP based server for satisfying TCP/IP based requests from the client workstation.

8. The system of claim 1 wherein the micro-server comprises: a hyperlink to a website associated with the remote device.

9. The system of claim 1 wherein the micro-server comprises: a web site associated with the remote device.

10. The system of claim 9 wherein the web site comprises: a home page for publishing the remote device's parametric data.

11. The system of claim 9 wherein the web site comprises: a control page for providing authorized individuals access to the remote device's control functions.

12. The system of claim 9 wherein the web site comprises: a maintenance page for providing access to the remote device's maintenance data.

13. The system of claim 12 wherein the maintenance page comprises: a hyperlink to online maintenance documentation.

14. The system of claim 9 wherein the web site comprises: a maintenance page for providing access to the remote device's maintenance functions.

15. The system of claim 9 wherein the web site comprises: an administration page for allowing authorized individuals to set operating characteristics of the remote device.

16. The system of claim 9 wherein the web site comprises: a discover page for supplying information to the client workstation during automatic discovery.

17. The system of claim 1 further comprising: a default applet server for providing default applets to the client workstation for interfacing with the remote device from the client workstation.

18. The system of claim 1 further comprising: a time server for providing current time information to the system, the time information being maintained based at least in part upon universal coordinated time.

19. The system of claim 1 further comprising: a maintenance server for providing non-volatile storage for the remote device's maintenance records, the non-volatile storage being hyperlinked from the remote device.

20. The system of claim 1 further comprising: an auto-discovery and view server for automatically
detecting a micro-server-enabled device being coupled to an interface and
publishing micro-server-enabled device data to the client workstation.

21. The system of claim 1 further comprising: a local applet server for retrieving device-specific applets from a server associated with the remote device and for making the applets available to the client workstation.

22. The system of claim 1 further comprising: a browser for interacting with the remote device.

23. The system of claim 1 further comprising: a client-side application programming interface for providing the client workstation with a software interface to the remote device.

24. The system of claim 1 wherein at least a portion of the information is organized as addressable variables.

25. A remote device capable of providing information about itself to a client workstation, the remote device comprising:
   a micro-server for transmitting the information to the client workstation while abstracting communication protocol details from the remote device's control software;
   an application programming interface for providing an interface between the remote device's control software and the micro-server, the control software initializing the micro-server by providing, via a function call defined by the application programming interface, at least one pointer to at least one callback function for accessing the information, the micro-server accessing the information by calling the at least one callback function;
   a hardware Ethernet interface; and
   a TCP/IP protocol stack for interfacing between the micro-server and the hardware Ethernet interface.

26. The remote device of claim 25 further comprising: a computer capable of supporting a standard operating system environment.

27. A micro-circuit board for providing information about a remote device to a client workstation, the micro-circuit board comprising:
   a micro-server for transmitting the information to the client workstation while abstracting communication protocol programming details from the remote device's control software;
   an application programming interface for providing an interface between the remote device's control software and the micro-server, the control software initializing the micro-server by providing, via a function call defined by the application programming interface, at least one pointer to at least one callback function for accessing the information the micro-server accessing the information by calling the at least one callback function;
   a hardware Ethernet interface; and
   a TCP/IP protocol stack for interfacing between the micro-server and the hardware Ethernet interface.

28. A system for providing information about a remote device to a client workstation, the system comprising:
   a first processor for running the remote device's control software and a first side of an application programming interface ("API");
   a second processor for running micro-server software and abstracting communication protocol details from the first processor by running a second side of the API, the control software initializing the micro-server by providing, via a function call defined by the API, at least one pointer to at least one callback function for accessing the information, the micro-server accessing the information by calling the at least one callback function and transmitting the information to the client workstation, the second processor accessing a TCP/IP stack to interface with the hardware Ethernet interface; and a hardware interface between the first processor and the second processor.

29. A system for providing information about a remote device to a client workstation, the system comprising:

a processor for running remote device control software and a first side of an application programming interface ("API"), the processor being mounted on a PC circuit board, the PC circuit board being insertable into a computer;

a computer for abstracting communication protocol details from the processor by running micro-server software including a second side of the API, the control software initializing the micro-server by providing, via a function call defined by an application programming interface, at least one pointer to at least one callback function for accessing the information, the micro-server accessing the information by calling the at least one callback function and transmitting the information to the client workstation, the computer having a hardware Ethernet interface and a TCP/IP stack for interfacing with the hardware Ethernet interface; and a hardware interface between the processor and the computer.

30. A method for providing information about a remote device to a client workstation comprising the steps of:

providing to a micro-server, via a function call defined by an application programming interface, at least one pointer to at least one callback function;

accessing the information from the first device via the at least one callback function;

organizing the information into a format compatible with a communication protocol in preparation for making the information available to the client workstation;

making the information available to the client workstation; and abstracting the communication protocol from the remote device.

31. A system for accessing remote device data and communicating the data to a client workstation, the system comprising:

a remote device having an original equipment manufacturer ("OEM") software component for controlling operation of the remote device and a micro-server software component;

the micro-server software component for transmitting the remote device data to the client workstation, the micro-server software component having an original equipment manufacturer application programming interface ("OEM API") for allowing the OEM software to initialize the micro-server software, the initialization including the OEM software providing one or more callback functions to the micro-server software component to allow the micro-server software component to access OEM software component data through one or more functions defined by the OEM API, the OEM API abstracting micro-server software component implementation of networking protocol details from the OEM software component.

32. The system of claim 31 wherein the micro-server software component comprises non-blocking threads for returning processor control to the OEM software component without delays associated waiting for external events to occur.

33. The system of claim 31 wherein the micro-server software component is a binary software library linked to the OEM application.

34. The system of claim 31 wherein the micro-server software component includes a client-side refresh mode of operation that automatically updates a page displayed at the client workstation at fixed time intervals.

35. The system of claim 31 wherein the micro-server software component comprises an OEM data cache component for caching OEM data accessed by the micro-server software component thereby reducing overhead associated with frequent OEM API function calls.

* * * * *